US011279568B2

(12) United States Patent
Ramosevac et al.

(10) Patent No.: US 11,279,568 B2
(45) Date of Patent: Mar. 22, 2022

(54) HOT MELT ADHESIVE DISTRIBUTION SYSTEM

(71) Applicant: NORDSON CORPORATION, Westlake, OH (US)

(72) Inventors: Enes Ramosevac, Sugar Hill, GA (US); Charles P. Ganzer, Cumming, GA (US)

(73) Assignee: Nordson Corporation, Westlake, OH (US)

(*) Notice: Subject to any disclaimer, the term of this patent is extended or adjusted under 35 U.S.C. 154(b) by 17 days.

(21) Appl. No.: 16/524,452

(22) Filed: Jul. 29, 2019

(65) Prior Publication Data
US 2020/0039757 A1 Feb. 6, 2020

Related U.S. Application Data

(60) Provisional application No. 62/821,930, filed on Mar. 21, 2019, provisional application No. 62/712,362, filed on Jul. 31, 2018.

(51) Int. Cl.
*B65G 47/19* (2006.01)
*B65G 15/00* (2006.01)

(52) U.S. Cl.
CPC ............ *B65G 47/19* (2013.01); *B65G 15/00* (2013.01); *B65G 2201/042* (2013.01)

(58) Field of Classification Search
CPC ...... B65D 47/19; B65D 88/703; B65G 15/00; B65G 15/30; B65G 2201/042; B65G 47/18; B65G 23/04; B65G 23/12; B65G 47/19; B65G 47/1421; B65G 33/22; F17D 1/088

USPC ........................................................ 222/64
See application file for complete search history.

(56) References Cited

U.S. PATENT DOCUMENTS

| | | | | |
|---|---|---|---|---|
| 1,545,376 A | * | 7/1925 | Weatherby | B65D 88/66 222/196 |
| 1,644,175 A | * | 10/1927 | Church | B65G 65/44 222/202 |
| 2,750,059 A | * | 6/1956 | Hintz | A01D 90/10 414/502 |
| 3,121,593 A | * | 2/1964 | Mcilvaine | B65G 53/22 406/137 |
| 3,348,714 A | * | 10/1967 | Ash | B60P 1/16 414/489 |
| 3,489,025 A | * | 1/1970 | Phillips | B60P 1/36 474/109 |
| 3,747,810 A | | 7/1973 | Graser | |

(Continued)

FOREIGN PATENT DOCUMENTS

| EP | 3108969 A1 | 12/2016 |
|---|---|---|
| JP | 55-096834 U | 7/1980 |

(Continued)

*Primary Examiner* — Benjamin R Shaw
(74) *Attorney, Agent, or Firm* — BakerHostetler

(57) ABSTRACT

A distribution system for storing and conveying a supply of material is described. The distribution system includes a bin for storing and conveying a supply of material. The bin includes a housing defining an internal chamber configured to receive the material, at least one outlet configured to direct the material from the bin, a plate defining a lower end of the internal chamber and supporting and directing the material to the at least one outlet, an agitation device attached to the plate, and a gasket disposed between the plate and the housing.

25 Claims, 26 Drawing Sheets

(56) References Cited

U.S. PATENT DOCUMENTS

| | | | |
|---|---|---|---|
| 3,773,069 A | 11/1973 | Rebentisch | |
| 3,796,354 A * | 3/1974 | Steinke | B60P 1/36 222/626 |
| 3,873,032 A * | 3/1975 | Jellis, Jr. | B60P 1/38 239/658 |
| 4,174,792 A * | 11/1979 | Jones | A01C 15/003 222/547 |
| 4,252,139 A * | 2/1981 | Davis | B01F 1/00 137/3 |
| 4,257,518 A * | 3/1981 | Stock | F23K 3/16 198/544 |
| 4,580,698 A * | 4/1986 | Ladt | B65G 47/19 177/122 |
| 4,595,125 A * | 6/1986 | Alwerud | G01G 11/12 222/55 |
| 5,156,499 A * | 10/1992 | Miklich | B65G 53/40 406/127 |
| 5,176,295 A * | 1/1993 | Stefanik | B65D 88/68 222/271 |
| 5,653,567 A * | 8/1997 | Taylor | B60P 1/36 222/505 |
| 6,024,304 A | 2/2000 | Sawada | |
| 6,138,591 A * | 10/2000 | Horsch | A01C 7/081 111/178 |
| 6,379,086 B1 * | 4/2002 | Goth | B29C 48/285 406/75 |
| 7,972,087 B2 * | 7/2011 | Davison | A22C 21/0053 406/28 |
| 9,302,857 B2 * | 4/2016 | Clark | B05C 11/1002 |
| 9,470,368 B2 * | 10/2016 | Ganzer | F17D 1/088 |
| 9,580,257 B2 * | 2/2017 | Varga | B05C 11/1042 |
| 10,654,646 B1 * | 5/2020 | Lin | B65D 88/72 |
| 2001/0041117 A1 * | 11/2001 | Comardo | B01J 8/0035 414/160 |
| 2002/0070241 A1 * | 6/2002 | Wehrmann | B65B 37/08 222/281 |
| 2007/0160452 A1 * | 7/2007 | Kerwin | E04G 21/025 414/722 |
| 2008/0000757 A1 * | 1/2008 | Maguire | B60P 1/36 198/617 |
| 2012/0061206 A1 * | 3/2012 | Furuyama | B65G 47/19 198/540 |
| 2014/0119842 A1 | 5/2014 | Jeter | |
| 2016/0244267 A1 * | 8/2016 | Rendell | B65G 47/31 |
| 2016/0376107 A1 * | 12/2016 | Beaujot | B65G 43/08 177/1 |
| 2017/0234533 A1 * | 8/2017 | Lin | F23G 7/10 110/165 R |
| 2017/0290100 A1 | 10/2017 | Mosli | |

FOREIGN PATENT DOCUMENTS

| | | |
|---|---|---|
| KR | 10-1463501 B1 | 11/2014 |
| WO | 2015/042382 A1 | 3/2015 |

\* cited by examiner

HOT MELT ADHESIVE DISTRIBUTION SYSTEM

CROSS REFERENCE TO RELATED APPLICATIONS

This application claims the benefit of U.S. Provisional Patent App. No. 62/712,362, filed Jul. 31, 2018, and U.S. Provisional Patent App. No. 62/821,930, filed Mar. 21, 2019, the disclosures of which are hereby incorporated by reference herein.

TECHNICAL FIELD

This application is directed to a device for holding and supplying a material to one or more melters. Specifically, this application relates to a device having a conveyor for selectively transferring an amount of material from a hopper to a distribution bin that includes at least one outlet.

BACKGROUND

Typical material application systems for applying material to a substrate include a storage device that holds a supply of the material, as well as a pneumatic pump for transferring the material to one or more melters. However, in dispensing operations that utilize hot melt adhesives, the hot melt adhesive is often manually loaded into the melters or is transported through hoses or pipes in a molten state. This is because agitating non-melted hot melt adhesive in a storage container using vibratory forces and presenting the hot melt adhesive to a pneumatic pump for air conveyance in a solid state can be difficult, as the inherent physical properties of certain hot melt adhesive can cause the adhesive to absorb some or all of the vibratory forces, which diminishes their ability to be fluidized. As a result, these hot melt adhesive are more prone to being presented to the pneumatic pump in clumps, which can cause the hot melt adhesive to become lodged in various aspects of a conveying system. This can lead to a significant decrease in pumping effectiveness and even failure of a pneumatic conveying system altogether. Should the hot melt adhesive be presented to the pneumatic pump in a sufficiently fluidized form, pneumatic transfer of the material will generally occur without issue.

As a result, there is a need for a distribution system having a mechanism for fluidizing material such as hot melt adhesive prior to transfer using a pneumatic pump.

SUMMARY

An embodiment of the present disclosure is a distribution system for storing and conveying a supply of material. The distribution system includes a hopper defining a cavity for storing the supply of material, the hopper having an upper end and a lower end opposite the upper end along a vertical direction. The distribution system also includes a conveyor positioned at the lower end of the hopper, where a portion of the conveyor is configured to rotate about an axis that is perpendicular to the vertical direction so as to selectively transfer a quantity of the material from the hopper. The distribution system also includes a distribution bin attached to the lower end of the hopper and configured to receive the material from the hopper, the distribution bin having at least one outlet configured to direct the material from the distribution bin.

Another embodiment of the present disclosure is a distribution system for storing and conveying a supply of material. The distribution system can include a hopper defining a cavity for storing the supply of material, the hopper having an upper end and a lower end opposite the upper end along a vertical direction, as well as a conveyor positioned at the lower end of the hopper, wherein the conveyor is configured to selectively transfer a quantity of the material from the hopper. The distribution system can also include a distribution bin comprising a housing defining an internal chamber configured to receive the material from the hopper, at least one outlet configured to direct the material from the distribution bin, a plate defining a lower end of the internal chamber and configured to support the material, where the plate defines at least one passage extending therethrough, and a manifold positioned below the plate, wherein the manifold is configured to direct pressurized air through the at least one passage so as to move the material within the internal chamber.

BRIEF DESCRIPTION OF THE DRAWINGS

The foregoing summary, as well as the following detailed description, will be better understood when read in conjunction with the appended drawings. The drawings show illustrative embodiments of the disclosure. It should be understood, however, that the application is not limited to the precise arrangements and instrumentalities shown.

DETAILED DESCRIPTION OF ILLUSTRATIVE EMBODIMENTS

Figure 1A:
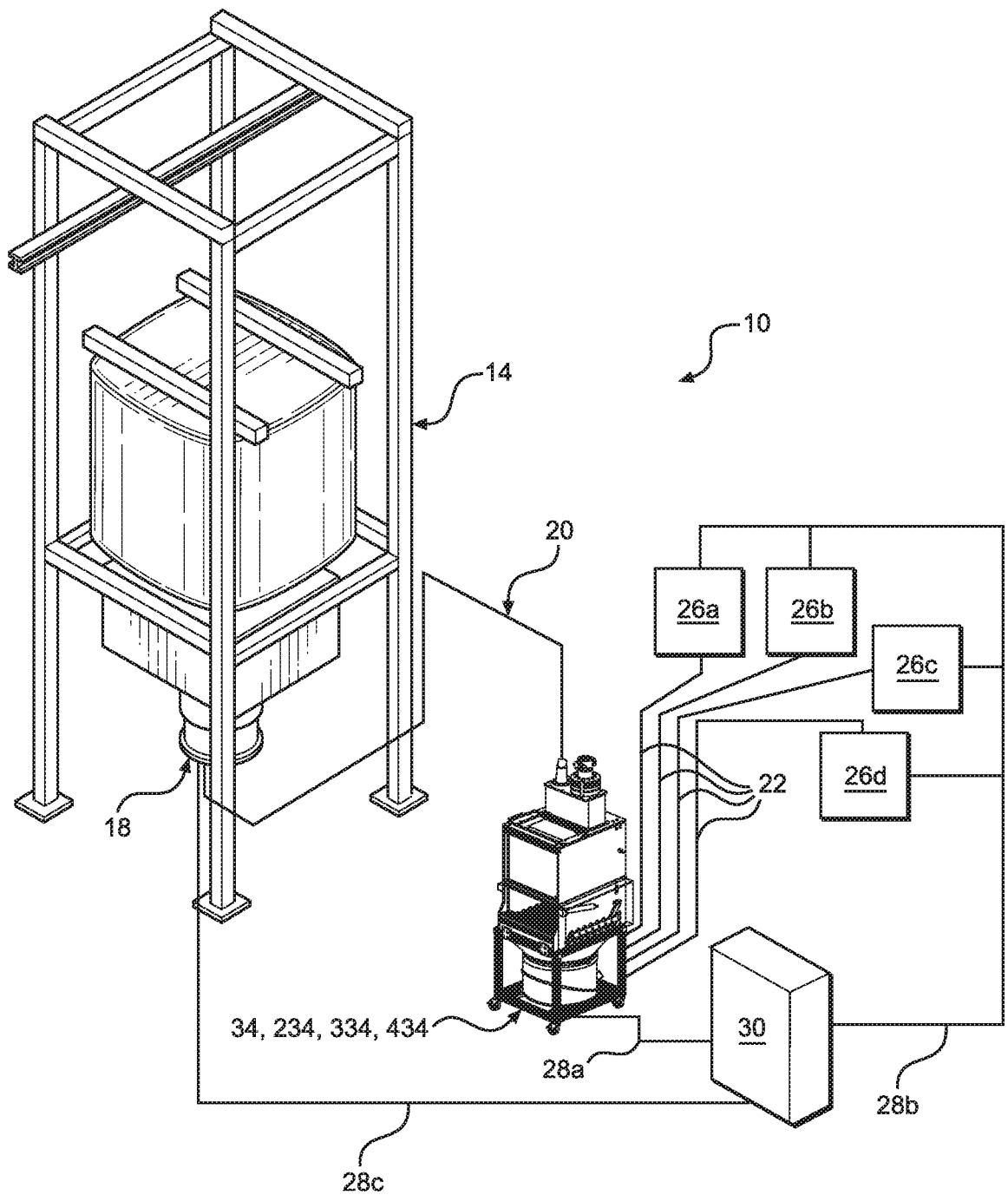
FIG. 1A is a schematic view of an application system 10 according to an embodiment of the present disclosure.

Described herein are application systems 10, 10', 10" for selectively transferring material from a bulk storage container 14 to at least one melter 26. Certain terminology is used to describe the application systems 10, 10', 10" in the following description for convenience only and is not limiting. The words "right", "left", "lower," and "upper" designate directions in the drawings to which reference is made. The words "inner" and "outer" refer to directions toward and away from, respectively, the geometric center of the description to describe the application systems 10, 10', 10" and related parts thereof. The words "forward" and "rearward" refer to directions in a longitudinal direction 2 and a direction opposite the longitudinal direction 2 along the application systems 10, 10', 10" and related parts thereof. The terminology includes the above-listed words, derivatives thereof and words of similar import.

Unless otherwise specified herein, the terms "longitudinal," "vertical," and "lateral" are used to describe the orthogonal directional components of various components of the application systems 10, 10', 10" as designated by the longitudinal direction 2, lateral direction 4, and vertical direction 6. It should be appreciated that while the longitudinal and lateral directions 2, 4 are illustrated as extending along a horizontal plane, and the vertical direction 6 is illustrated as extending along a vertical plane, the planes that encompass the various directions may differ during use.

Referring to FIG. 1A, an application system 10 is depicted that can be configured to store a supply of material and selectively transport the material to a plurality of melters 26a-26d. The application system 10 can include a bulk storage container 14 configured to store a bulk supply of the material. The bulk storage container 14 can comprise a hopper that can be refilled automatically or refilled manually by an operator of the application system 10 as needed. A transfer bin 18 can be operably connected to the bulk storage container 14, where the transfer bin 18 is configured to selectively receive material from the bulk storage container 14 and transfer the material downstream to other components of the application system 10. The application system 10 can include a transfer hose 20, which in other embodiments can comprise a pipe or other suitable transport mechanism, that extends from the transfer bin 18 to a distribution system 34, 234, 334, 434, where each of the distributions systems 34, 234, 334, 434 will be described in detail below. From the distribution system 34, 234, 334, 434, the application system 10 can selectively transfer amounts of the material through at least one hose to a plurality of melters 26a-26d. In the depicted embodiment, the plurality of melters 26a-26d includes four melters 26a, 26b, 26c, 26d, though the application system 10 can include more or less melters as desired. Further, each of the plurality of melters 26a-26d is depicted as receiving material from the distribution system 34, 234, 334, 434 via a respective hose 22, though the use of more or less hoses 22 is contemplated.

Additionally, in other embodiments, the application system 10 can include more than one distribution system 34, 234, 334, 434, where each of the distribution systems 34, 234, 334, 434 is configured to receive material from the bulk storage container 14 and transfer the material to a respective plurality of melters. In addition to multiple distribution systems 34, 234, 334, 434, in other embodiments the application system 10 can include more than one bulk storage container 14 and corresponding transfer bin 18, such that each of the bulk storage containers 14 is configured to supply material to one or more of the distributions systems 34, 234, 334, 434.

The application system 10 can also include a controller 30 for receiving information from and controlling various aspects of the application system 10. The controller 30 can be in signal communication with the distribution system 34, 234, 334, 434 through signal connection 28a, the melters 26a-26d through signal connection 28b, and the transfer bin 18 and bulk storage container 14 through signal connection 28c. Any of the signal connections 28a-28c can comprise a wired and/or wireless connection. Further, any of the above-described components of the application system 10 can include a separate controller capable of controlling that particular component.

The controller 30 can comprise any suitable computing device configured to host a software application for monitoring and controlling various operations of the application system 10 as described herein. It will be understood that the controller 30 can include any appropriate computing device, examples of which include a processor, a desktop computing device, a server computing device, or a portable computing device, such as a laptop, tablet, or smart phone. Specifically, the controller 30 can include a memory and a human-machine interface (HMI) device. The memory can be volatile (such as some types of RAM), non-volatile (such as ROM, flash memory, etc.), or a combination thereof. The controller 30 can include additional storage (e.g., removable storage and/or non-removable storage) including, but not limited to, tape, flash memory, smart cards, CD-ROM, digital versatile disks (DVD) or other optical storage, magnetic tape, magnetic disk storage or other magnetic storage devices, universal serial bus (USB) compatible memory, or any other medium which can be used to store information and which can be accessed by the controller 30. The HMI device can include inputs that provide the ability to control the controller 30, via, for example, buttons, soft keys, a mouse, voice actuated controls, a touch screen, movement of the controller 30, visual cues (e.g., moving a hand in front of a camera on the controller 30), or the like. The HMI device can provide outputs via a graphical user interface, including visual information, such as the visual indication of the current conditions within the application system 10, as well as acceptable ranges for these parameters via a display. Other outputs can include audio information (e.g., via speaker), mechanically (e.g., via a vibrating mechanism), or a combination thereof. In various configurations, the HMI device can include a display, a touch screen, a keyboard, a mouse, a motion detector, a speaker, a microphone, a camera, or any combination thereof. The HMI device can further include any suitable device for inputting biometric information, such as, for example, fingerprint information, retinal information, voice information, and/or facial characteristic information, for instance, so as to require specific biometric information for accessing the controller 30.

Figure 1B:
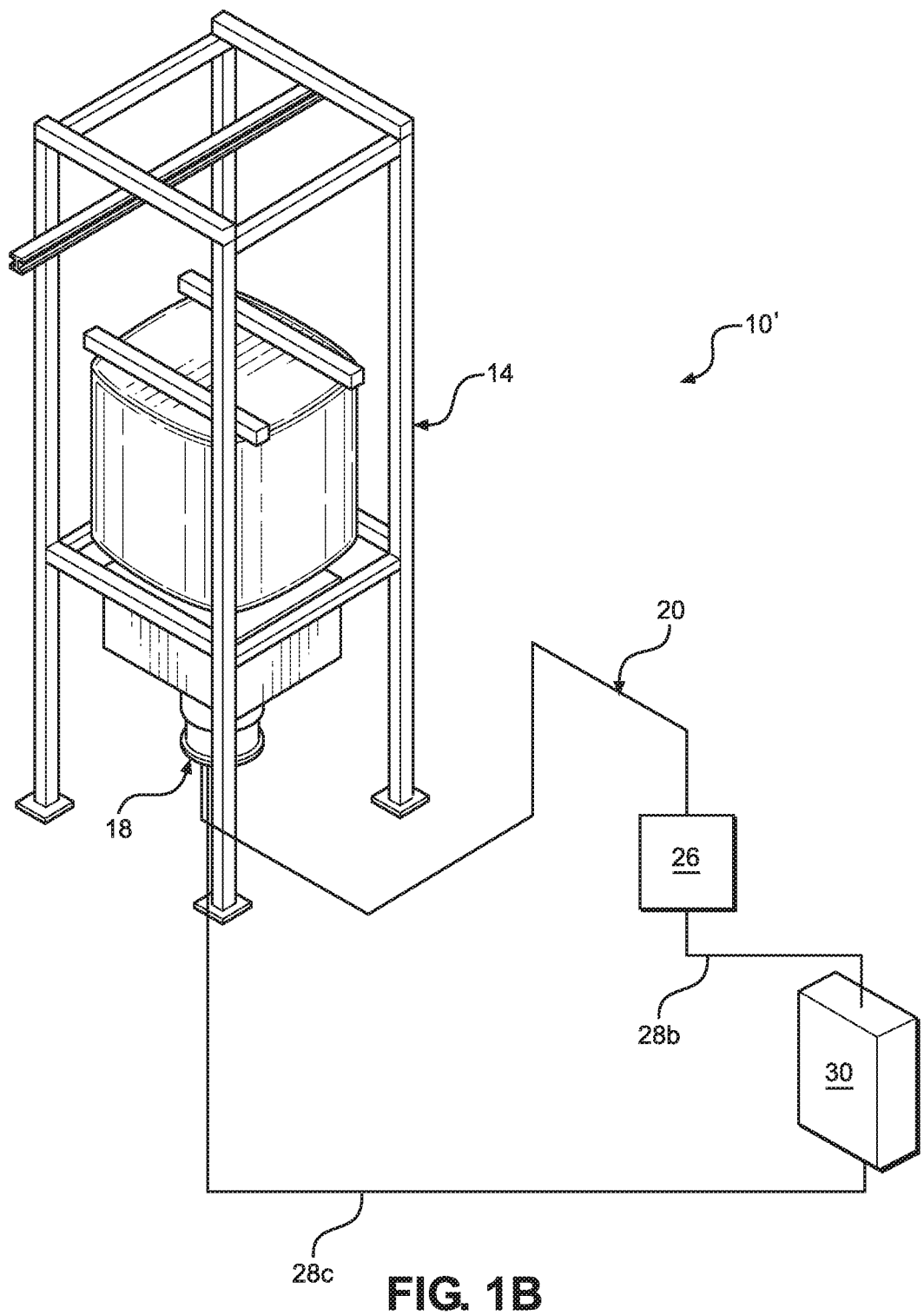
FIG. 1B is a schematic view of an application system according to another embodiment of the present disclosure.

Referring to FIG. 1B, another embodiment of an application system 10' is depicted. The application system 10' shares similar features with the application system 10, and as a result such features will be labeled similarly here and not described further for brevity. In contrast with the application system 10, the application system 10' does not include a distribution system 34, 234, 334, 434. As a result, in the application system 10' the bulk storage container 14 can provide material to the transfer bin 18, which is configured to transfer the material through a transfer hose 20 directly to a melter 26.

Figure 1C:
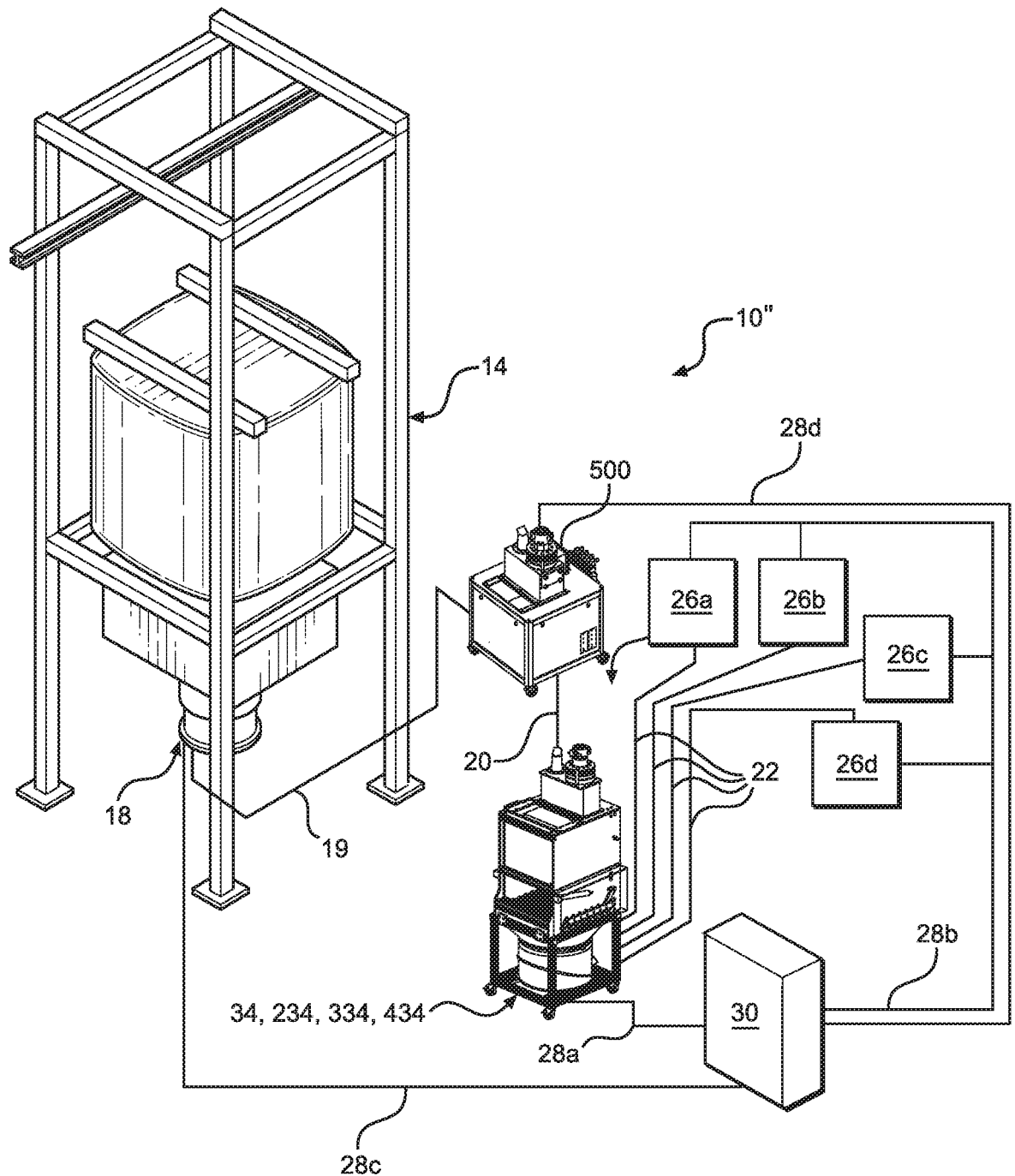
FIG. 1C is a schematic view of an application system according to a further embodiment of the present disclosure.
Figure 2:
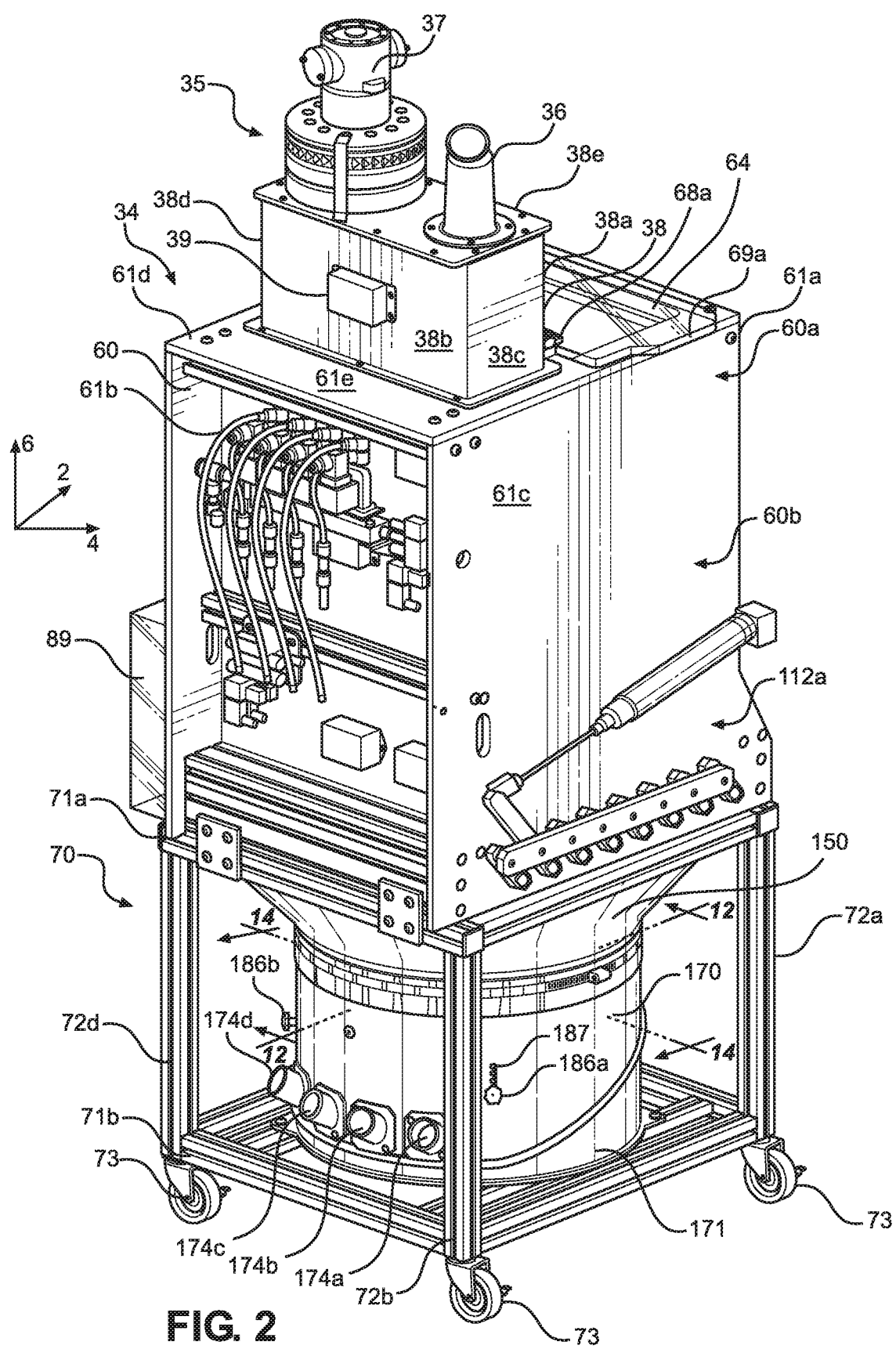
FIG. 2 is a perspective view of a distribution system of the application system shown in FIG. 1A.
Figure 3:
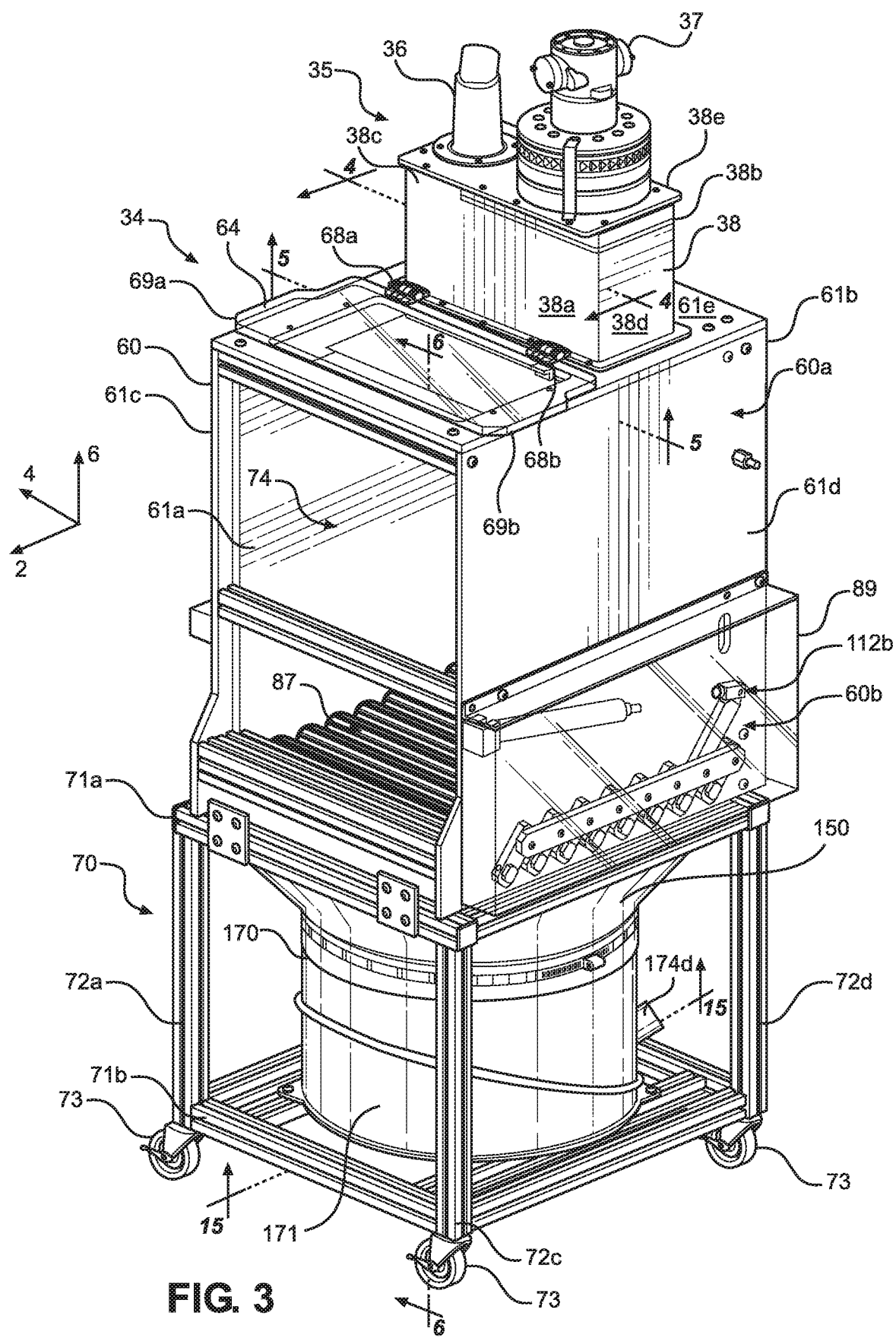
FIG. 3 is an alternative perspective view of the distribution system shown in FIG. 1A.
Figure 4:
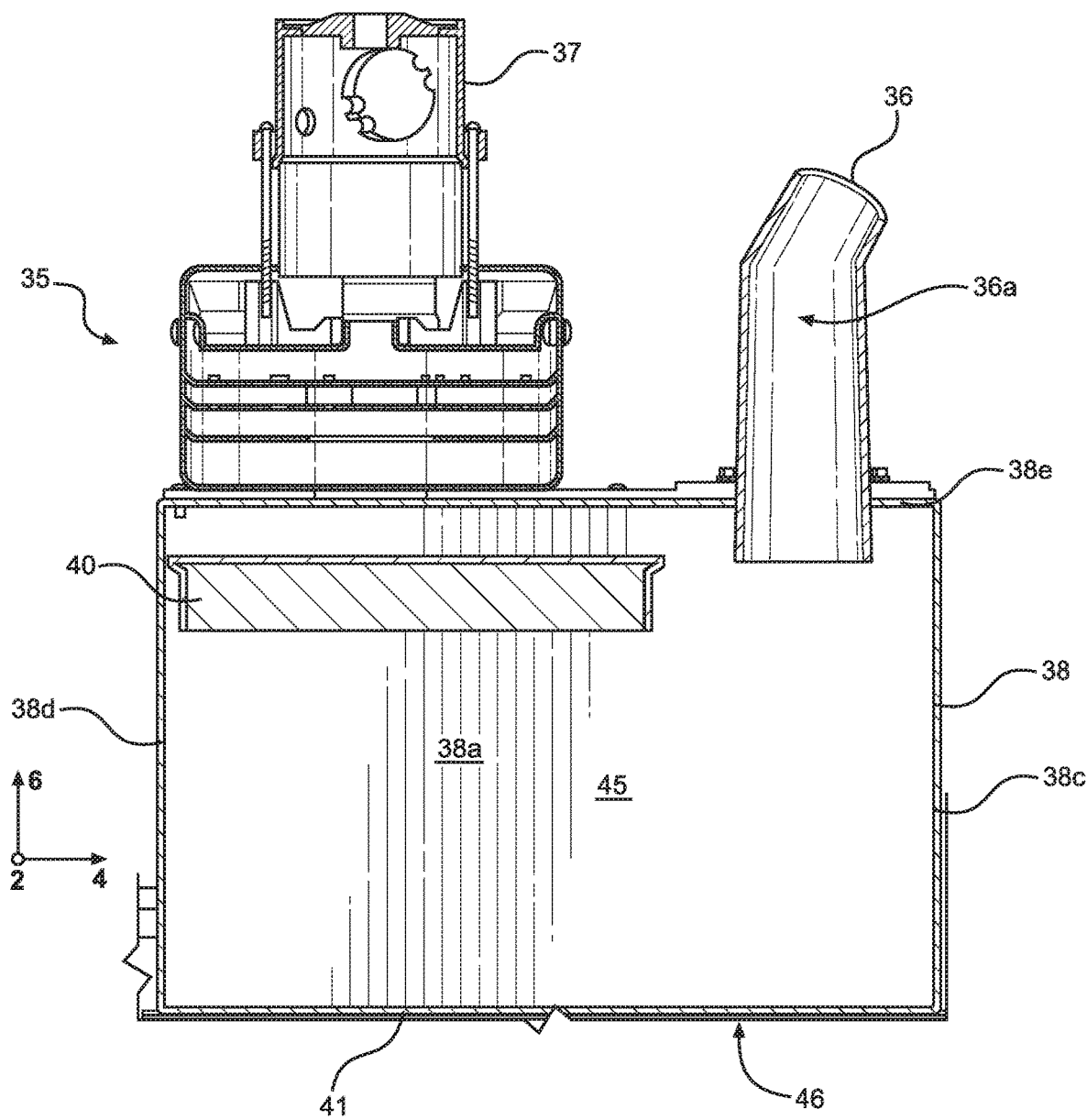
FIG. 4 is a side cross-sectional view of a vacuum unit of the distribution system shown in FIG. 2, taken along line 4-4 shown in FIG. 3.
Figure 5:
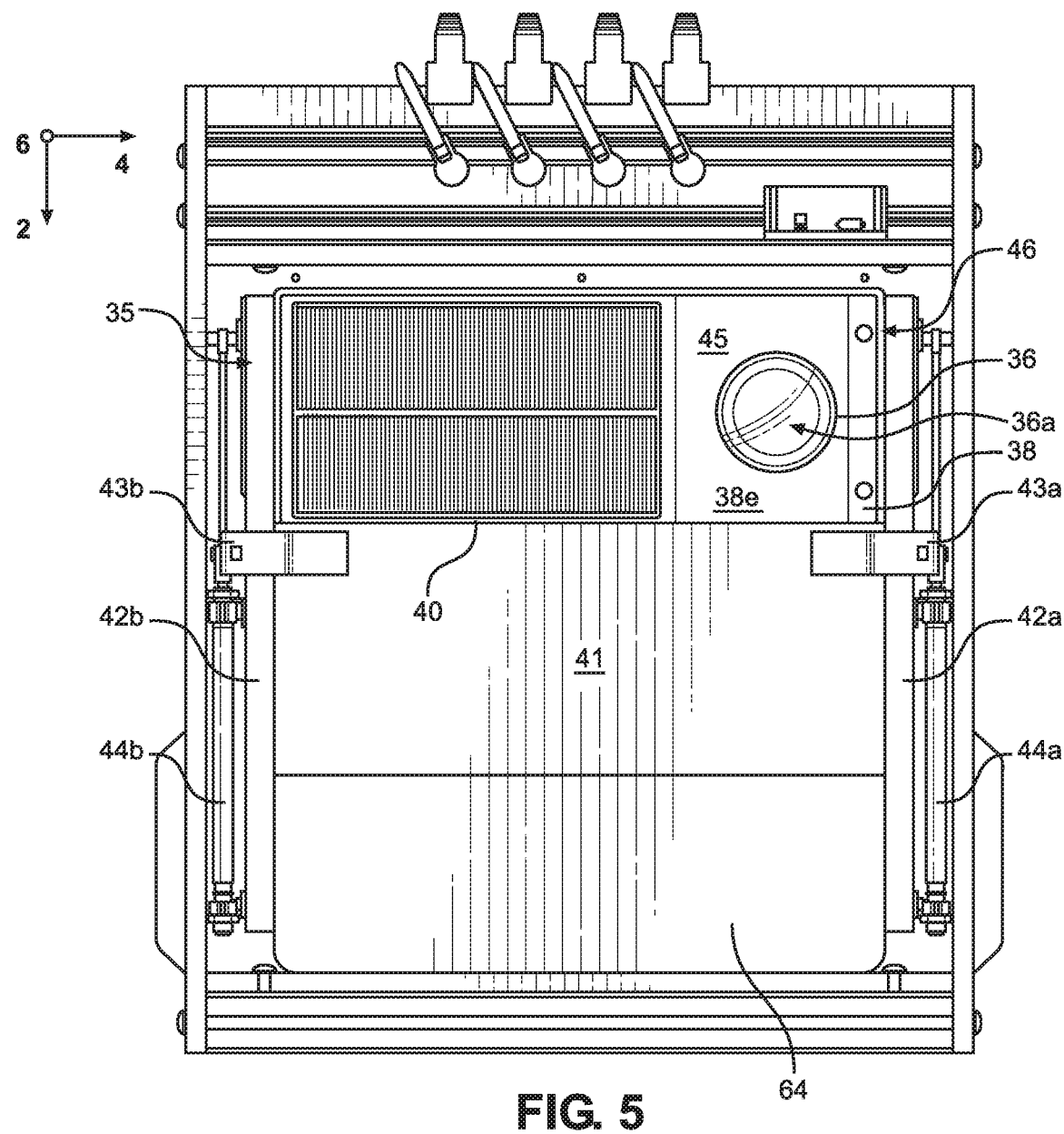
FIG. 5 is an upper cross-sectional view of the distribution system shown in FIG. 2, taken along line 5-5 shown in FIG. 3.

Now referring to FIG. 1C, a further embodiment of an application system 10" is depicted. The application system 10" shares similar features with the application systems 10, 10', and as a result such features will be labeled similarly here and not described further for brevity. In the application system 10", the bulk storage container 14 can provide material to the transfer bin 18, which is configured to transfer the material through a transfer hose 19 to a booster bin 500, which will be described further below. The booster bin 500 can be in signal communication with the controller 30 through a signal connection 28d, which can be a wired or wireless connection, though it is contemplated that the booster bin 500 can include a separate controller. Like the transfer hose 20, the transfer hose 19 can be a pipe or other suitable transport mechanism. From the booster bin 500, the application system 10" selectively transfer amounts of the material through a transfer hose 20 to a distribution system 34, 234, 334, 434. From the distribution system 34, 234, 334, 434, the application system 10" can selectively transfer amounts of the material through at least one hose to a plurality of melters 26a-26d. In the depicted embodiment, the plurality of melters 26a-26d includes four melters 26a, 26b, 26c, 26d, though the application system 10" can include more or less melters as desired. Further, each of the plurality of melters 26a-26d is depicted as receiving material from the distribution system 34, 234, 334, 434 via a respective hose 22, though the use of more or less hoses 22 is contemplated.

Referring to FIGS. 2-15, a first embodiment of a distribution system 34 will be described. The upper end of the distribution system 34 includes a hopper 60 for receiving and holding a supply of the material. The hopper 60 has an upper end 60a, and a lower end 60b opposite the upper end 60a along the vertical direction 6. The hopper 60 has a front side 61a, a rear side 61b opposite the front side 61a along the longitudinal direction 2, a left side 61c that extends from the front side 61a to the rear side 61b, and a right side 61d opposite the left side 61c along the lateral direction 4 that also extends from the front side 61a to the rear side 61b. The front side 61a can be comprised of a translucent polymer or glass that allows an operator of the distribution system 34 to view the contents of the hopper 60. However, in other embodiments any of the front, rear, left, and right sides 61a-61d can have a portion comprising a translucent material. Further, the present disclosure is not intended to be limited to the materials for the hopper 60 specifically enumerated above.

The distribution system 34 can also include an upper plate 60e that extends from the left side 61c to the right side 61d and a lid 64 attached to the upper plate 60e. The lid 64 can be attached to the upper plate 60e through a set of laterally-spaced hinges 68a-68b. The lid 64 can include first and second lips 69a, 69b oppositely disposed on the lid 64 for manual grasping by an operator of the distribution system 34. As a result, the lid 64 can be manually swung open by the operator to allow for access to a cavity 74 defined by the hopper 60 for storing the supply of material. The operator can thus manually open the lid 64 whenever a supply of material within the hopper 60 is depleted and add additional material to the hopper 60 as desired. Though a lid 64 attached to the hopper 60 through hinges 68a-68d is specifically described, other methods for providing access to the hopper 60 for manual filling are contemplated.

Referring to FIGS. 2-5, the distribution system 34 can include a vacuum unit 35 attached to the hopper 60 at its upper end 60a. The vacuum unit 35 can include an entry hose 36 configured to connect to the transfer hose 20 that extends from the transfer bin 18, where the vacuum unit 35 is configured to allow material to be drawn through the transfer hose 20, through a channel 36a defined by the entry hose 36, and into the vacuum unit 35. The vacuum unit 35 can comprise a housing 38, where the housing defines a hollow rectangular box. As such, the housing 38 can include a front side 38a, a rear side 38b opposite the front side 38a along the longitudinal direction 2, left side 38c that extends from the front side 38a to the rear side 38b, and a right side 38d opposite the left side 38c along the lateral direction 4 that also extends from the front side 38a to the rear side 38b. The housing 38 can also include a top side 38e that extends between each of the sides 38a-38d.

The housing 38 of the vacuum unit 35 can define a chamber 45 configured to receive the material entering the housing 38 through the entry hose 36 and store an amount of the material. The vacuum unit 35 can further include a vacuum pump 37 attached to the housing 38 at the top side 38e and in communication with the chamber 45. The vacuum pump 37 can be configured to provide a vacuum force within the chamber 45 such that the material is pulled through the transfer hose 20 and into the chamber 45. The vacuum pump 37 can comprise an electrically-powered vacuum motor using an integrated turbine to create a suction force, though other types of vacuum pumps are contemplated. The vacuum unit 35 can include a filter 40 disposed within the chamber 45 adjacent the vacuum pump 37 so as to prevent material brought into the chamber 45 from being sucked into the vacuum pump 37, which would cause the vacuum pump 37 to operate poorly or completely malfunction. The vacuum unit 35 can also include a level sensor 39 attached to the housing 38. Though depicted as attached to the rear side 38b, it is contemplated that the level sensor 39 can be attached to any of the sides 38a-38d as desired. The level sensor 39 can be a capacitive sensor, though other types of level sensors are contemplated. In operation, the level sensor 39 can be configured to detect the level of material disposed within the chamber 45 of the vacuum unit 35. The level sensor 39 can be in signal communication with the controller 30, such that the level sensor 39 can send a signal to the controller 30 that is indicative of the measured material level within the chamber 45. The controller 30 can be configured to direct the vacuum pump 37 to pull material into the chamber 45 until the level sensor 39 detects a predetermined level of material within the chamber 45. Alternatively, the controller 30 can direct the vacuum pump 37 to pull material into the chamber 45 in a time-based pattern To allow material to transfer from the vacuum unit 35 to the hopper 60, the housing 38 can define an opening 46 at the bottom of the chamber 45 that allows the chamber 45 to be in fluid communication with the cavity 74 defined by the hopper 60. To control the transfer of material from the vacuum unit 35 to the hopper 60, the distribution system 34 can include a trap door 41 configured to selectively cover the opening 46. Specifically, the trap door 41 can be configured to move along the longitudinal direction 2 to selectively cover the opening 46. However, in other embodiments, the trap door 41 can utilize other methods of movement, such as translation along any of the longitudinal, lateral, and vertical directions 2, 4, 6, rotation about an axis, etc.

To enable movement of the trap door 41, the distribution system 34 can include first and second rails 42a, 42b that extend along the longitudinal direction 2. The first and second rails 42a, 42b can be attached to the upper plate 60e of the hopper 60, though other mounting locations for the first and second rails 42a, 42b are contemplated. The distribution system 34 can include first and second arms 43a, 43b, where each of the first and second arms 43a, 43b are configured to attach to opposing sides of the trap door 41. The first and second arms 43a, 43b can also operably connect to the first and second rails 42a, 42b, respectively, so as to support the trap door 41 and enable movement of the trap door 41 along the first and second rails 42a, 42b. To move the trap door 41, a first hydraulic cylinder 44a can be attached to the first arm 43a, and/or a second hydraulic cylinder 44b can be attached to the second arm 43b. The controller 30 can be in signal communication with the first and/or second hydraulic cylinders 44a, 44b so as to instruct each of the first and/or second hydraulic cylinders 44a, 44b to selectively translate so as to move the trap door 41 along the first and second rails 42a, 42b.

In operation, the trap door 41 is configured to transition between a closed position, where the trap door 41 covers the opening 46 to prevent material from falling from the chamber 45, and an open position, where the trap door 41 is at least partially offset from the opening 46 along the longitudinal direction 1 to allow material to fall from the chamber 45 into the cavity 74. The controller 30 can automatically instruct the first and second hydraulic cylinders 44a, 44b to transition the trap door 41 between the open and closed positions, or only do so upon receiving instructions from the operator via the HMI device of the controller 30. Additionally, the trap door 41 can be transitioned from the closed position to the open position based upon the level of material within the chamber 46 as sensed by the level sensor 39. In one embodiment, the trap door 41 is configured to transition from the closed position to the open position when the level sensor 39 detects that a level of the material within the chamber 45 reaches a predetermined level. The predetermined level can be input by the operator into the HMI device of the controller 30, or can be recalled from the memory of the controller 30 based upon the type of material being used, type of dispensing operation performed by the application system 10, etc. Alternatively, the trap door 41 is configured to transition from the closed position to the open position based upon a time-based fill pattern utilized by the vacuum pump 37

The hopper 60 can be elevated above a workshop floor by a base 70. The base 70 can include a top frame 71a and a bottom frame 71b opposite the top frame 71a along the vertical direction 6. The top frame 71a can be attached to the bottom frame 71b by a plurality of vertically extending legs 72a-72d. The legs can include a first leg 72a, a second leg 72b, a third leg 72c, and a fourth leg 72d. Though the legs 72a-72d and the top and bottom frames 71a, 71b are depicted as forming a substantially cube-shaped base 70, the shape of the base 70 is not intended to be limited to such. For example, the base can be cylindrical, can taper along the vertical direction 6, etc. The bottom frame 71b can be supported by a plurality of wheels, such as four wheels 73 that allow the distribution system 34 to be easily moved. Alternatively, the bottom frame 71b and/or any of the legs 72a-72d can rest directly upon a workshop floor, or can rest upon supports that do not allow for easy movement.

Now referring to FIGS. 6-8B, the hopper 60 can define an internal cavity 74 for storing a supply of the material. The internal cavity 74 can extend vertically from the lid 64 to the lower end 60b of the hopper 60, where an opening 75 is defined at the bottom ends of the sides 61a-61d. Adjacent the opening 75 at the lower end 60b of the hopper 60, the distribution system 34 includes a conveyor 87. In the embodiment depicted in FIGS. 1-7, the conveyor 87 includes a plurality of rollers 88a-88h. Specifically, the conveyor 87 can include a first roller 88a, second roller 88b, third roller 88c, fourth roller 88d, fifth roller 88e, sixth roller 88f, seventh roller 88g, and an eighth roller 88h. Each of the rollers 88a-88h can extend from the left side 61c of the hopper 60 to the right side 61d, as well as at least partially through each of the left and right sides 61c, 61d. Despite the fact that the conveyor 87 is shown to include eight rollers 88a-88h, the conveyor 87 can include more or less than eight rollers. For example, in other embodiments the conveyor 87 can include one roller, two rollers, three rollers, or more than eight rollers. Also, even though the rollers 88a-88h are shown as extending in a particular direction, all of the rollers 88a-88h can alternatively extend in any direction that is perpendicular to the vertical direction 6.

Figure 8A:
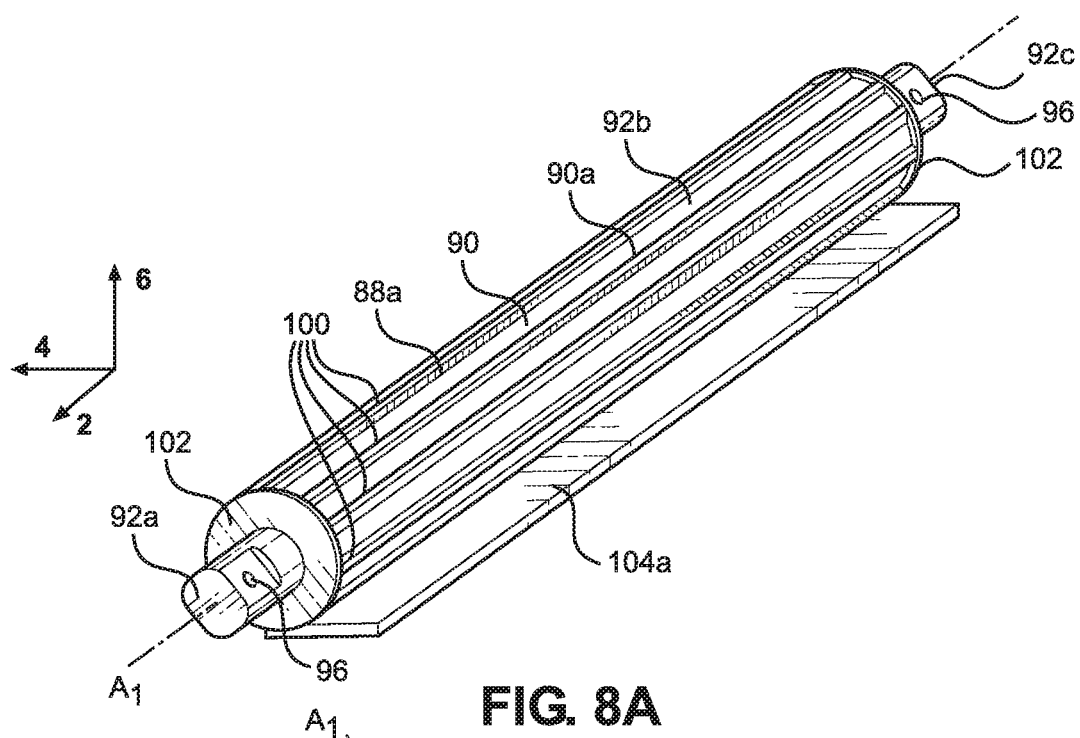
FIG. 8A is a perspective view of a roller of the distribution system shown in FIG. 2.
Figure 8B:
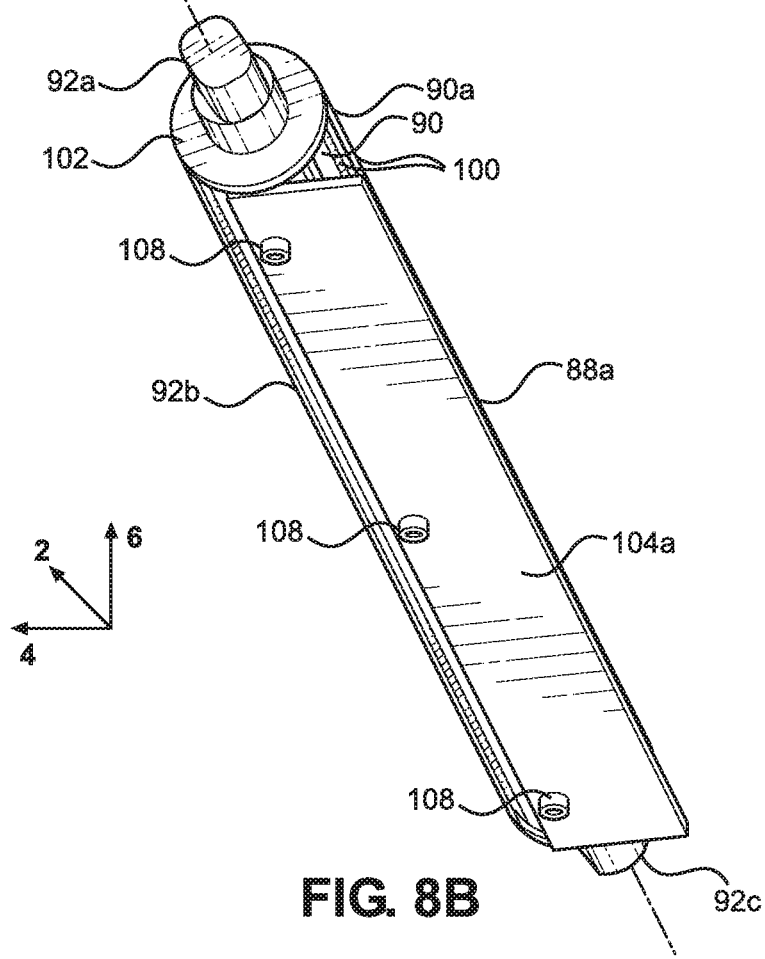
FIG. 8B is an alternative perspective view of the roller shown in FIG. 8A.

As shown in FIGS. 8A and 8B, the first roller 88a can have a body 90 that includes a central portion 92b, a first end 92a extending from the central portion 92b along the longitudinal direction 2, and a second end 92c opposite the first end 92a that also extends along the longitudinal direction 2. Though the first roller 88a is specifically shown and described, the description related to the first roller 88a can be representative of each of the rollers 88a-88h. Each of the first and second ends 92a, 92c can define a bore 96 that extends therethrough. The bores 96 can be configured to receive a fastener (not shown) or other feature for securing the first roller 88a to the first or second rotation mechanisms 112a, 112b, which will be described further below. The central portion 92b can have an outer surface 90a and a plurality of protrusions 100 extending radially outward from the outer surface 90a. As depicted, the protrusions 100 can each be longitudinally-extending ribs that each extend the length of the central portion 92b of the body 90 and are equally spaced radially about the entire circumference of the central portion 92b. However, it is contemplated that the protrusions 100 can take other forms as desired. For example, the protrusions 100 could extend helically about the body 90.

The distribution system 34 can also include a plurality of gates 104a-104h attached to a respective one of the rollers 88a-88h. The gate 104a, which can be representative of each of the gates 104a-104h, can extend substantially the length of the central portion 92b of the body 90 of the first roller 88a, and can attach to the body 90 through fasteners 108. Though fasteners 108 are specifically shown as the means for attaching the gates 104a-104h to the rollers 88a-88h, the gates 104a-104h can attach to the rollers 88a-88h through other mechanisms. For example, the gates 104a-104h can be attached to the rollers 88a-88h through welding, integral formation, snap-fit, etc. Each of the gates 104a-104h can have a substantially rectangular profile, though other shapes and/or sizes relative to the rollers 88a-88h are envisioned. Further, the fasteners 108 can allow the gates 104a-104h to be releasably attached to the rollers 88a-88h, such that an operator can replace any of the gates 104a-104h at any time, for reasons that will be explained below. The fasteners 108 can also allow the gates 104a-104h to be movably attached to the rollers 88a-88h so as to adjust the position of the gates 104a-104h relative to the respective roller 88a-88h to which they are attached. The gates 104a-104h can function to help prevent incidental flow of material through the gapes $G_1$-$G_7$ that exist between the rollers 88a-88h. The gaps $G_1$-$G_7$ will be discussed further below. Each of the gates 104a-104h can comprise a rigid material, such as metal or plastic, or a substantially flexible material, such as rubber or foam.

Continuing with FIGS. 6-8B, each of the rollers 88a-88h can extend through the distribution system 34 at the lower end 60b of the hopper 60 along the lateral direction 4. The first end 92a of the rollers 88a-88h can at least partially extend through the left side 61c of the hopper 60 and attach to the first rotation mechanism 112a. Similarly, the second end 92c of the rollers 88a-88h at least partially extend through the right side 61d of the hopper 60 and attach to the second rotation mechanism 112b. However, the rollers 88a-88h can be alternatively situated within the distribution system 34. For example, the rollers 88a-88h can extend substantially along the longitudinal direction 2. The central portion 92b of each of the rollers 88a-88h can be captured between the left and right sides 61c, 61d of the hopper 60 so as to secure the rollers 88a-88h within the hopper 60. To prevent portions of the rollers 88a-88h from directly contacting the hopper 60, each of the rollers 88a-88h can include a washer 102 disposed around each of the first and second ends 92a, 92c adjacent to the central portion 92b. The washers 102 can be nylon washers, though other types of washers are contemplated. Each of the rollers 88a-88h is configured to rotate about a respective axis $A_1$-$A_8$. Specifically, the first roller 88a can rotate about a first axis $A_1$, the second roller 88b can rotate about a second axis $A_2$, the third roller 88c can rotate about a third axis $A_3$, the fourth roller 88d can rotate about a fourth axis $A_4$, the fifth roller 88e can rotate about a fifth axis $A_5$, the sixth roller 88f can rotate about a sixth axis $A_6$, the seventh roller 88g can rotate about a seventh axis $A_7$, and the eighth roller 88h can rotate about an eighth axis $A_8$. Like the rollers 88a-88h, each of the axes $A_1$-$A_8$ can extend substantially along the lateral direction 4. However, each of the axes $A_1$-$A_8$ can extend along any direction that is perpendicular to the vertical direction 6. Each of the axes $A_1$-$A_8$ can extend through the body 90 of the respective roller 88a-88h, and particularly through the center of the first end 92a, through the central portion 92b, and through the second end 92c. Each of the rollers 88a-88h can be configured to rotate through an angular rotational range Θ about its respective axis $A_1$-$A_8$. In one embodiment, the rotational range Θ is about 40 degrees. However, the rotational range can be up to about 90 degrees. Alternatively, it is contemplated that the rollers 88a-88h may not be constrained to a rotational range, but can rotate continuously in either of the first or second rotational directions $R_1$, $R_2$.

Figure 9:
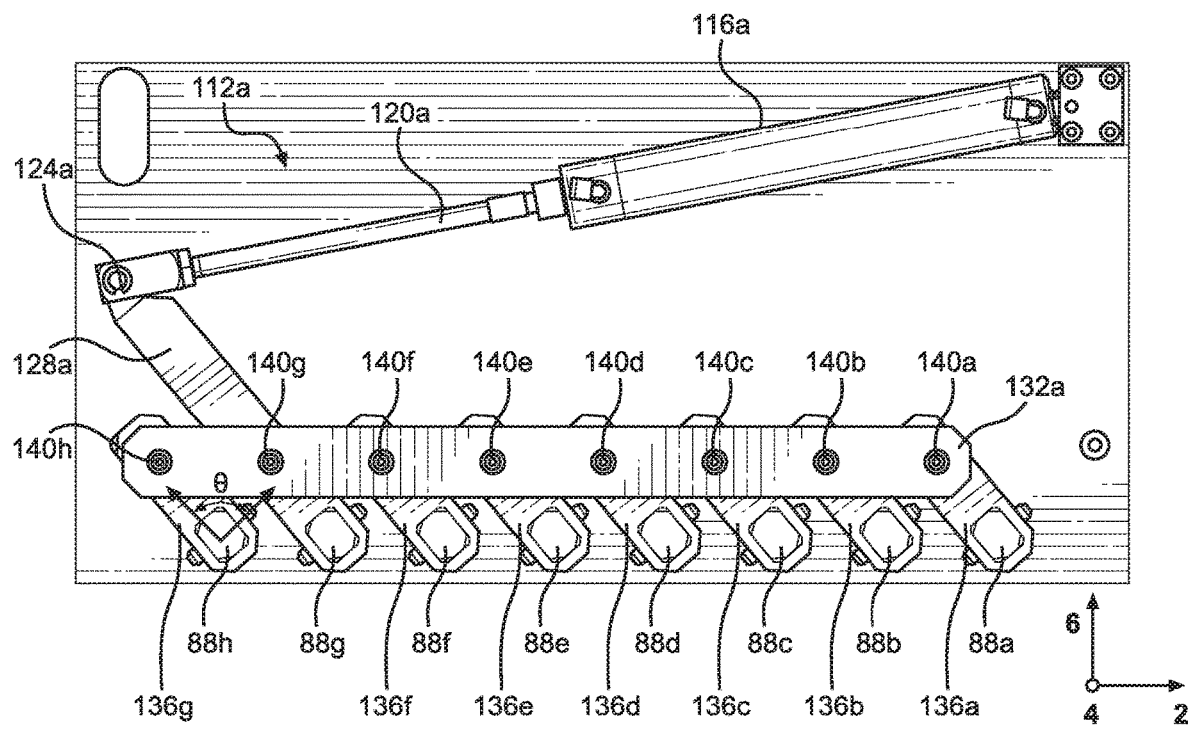
FIG. 9 is an enlarged side view of a first rotation mechanism of the distribution system shown in FIG. 2.

Referring to FIG. 9, each of the rollers 88a-88h can be operatively connected to a first rotation mechanism 112a, which is configured to rotate each of the rollers 88a-88h. The first rotation mechanism 112a can be attached to the outer side of the left side 61c of the hopper 60, though it is contemplated that the first rotation mechanism 112a can be attached to any of the sides 61a-61d of the hopper 60. The first rotation mechanism 112a can include a pneumatic cylinder 116a that is configured to selectively move a pneumatic ram 120a attached thereto. Though pneumatic actuation is explicitly described, the rotation mechanism can include other types of actuation mechanisms, such as hydraulically-powered devices, etc. The pneumatic ram 120a can be attached to a rotating arm 128a at a joint 124a, where the joint 124a can function as a rotational pivot between the pneumatic ram 120a and the rotating arm 128a. The rotating arm 128a can attach to the pneumatic ram 120a at one end, and the first end 92a of the seventh roller 88g at the other end. Between the pneumatic ram 120a and the seventh roller 88g, the rotating arm 128a can also attach to a lateral arm 132a that extends away from the rotating arm 128a. The lateral arm 132a can attach to the rotating arm 128a at a seventh pivot 140g, as well as a plurality of linkages 136a-136g at a plurality of respective pivots 140a-140f and 140h that are longitudinally spaced apart. For example, the lateral arm 132a can attach to a first linkage 136a at a first pivot 140a, a second linkage 136b at a second pivot 140b, a third linkage 136c at a third pivot 140c, a fourth linkage 136d at a fourth pivot 140d, a fifth linkage 136e at a fifth pivot 140e, and a sixth linkage 136f at a sixth pivot 140f, and a seventh linkage 136g at an eighth pivot 140h. Each of the rotating arm 128a, the lateral arm 132a, and the linkages 136a-136f can be configured as elongated metal bars or plates. However, other embodiments for these features are contemplated. The linkages 136a-136f and 136g can attach to the lateral arm 132a at one end, and a respective one of the rollers 88a-88f and 88g at the other end. For example, the first linkage 136a can attach to the first roller 88a, the second linkage 136b can attach to the second roller 88b, the third linkage 136c can attach to the third roller 88c, the fourth linkage 136d can attach to the fourth roller 88d, the fifth linkage 136e can attach to the fifth roller 88e, the sixth linkage 136f can attach to the sixth roller 88f, and the seventh linkage 136g can attach to the eighth roller 88h.

To rotate the rollers 88a-88h, the pneumatic cylinder 116a of the first rotation mechanism 112a can translate the pneumatic ram 120a into and out of the pneumatic cylinder 116a. Because the pneumatic ram 120a is connected to the rotating arm 128a at the joint 124a, translation of the pneumatic ram 120a causes the rotating arm 128a to rotate about the seventh axis $A_7$ of the seventh roller 88g. Rotation of the rotating arm 128a causes the lateral arm 132a, which is attached to the rotating arm 128a, to translate along an arc-shaped path. The translation of the lateral arm 132a further causes the linkages 136a-136g to pivot about the axes $A_1$-$A_6$ and $A_8$ of the respective roller 88a-88f and 88h to which they are attached. As the rollers 88a-88f and 88h are connected to the linkages 136a-136g and the rotating arm 128a is connected to the seventh roller 88g, the above described translation of the pneumatic ram 120a can cause each of the rollers 88a-88h to rotate in a uniform rotational direction. As the pneumatic ram 120a translates back and forth, the pneumatic ram 120a can cause each of the rollers 88a-88h to rotate through the rotational range Θ. This means that at one instance, each of the rollers 88a-88h can rotate together in a first rotational direction $R_1$ (counterclockwise direction), while at another instance, each of the rollers 88a-88h can rotate together in a second rotational direction $R_2$ (clockwise direction) that is opposite the first rotational direction $R_1$. The effect of the rotation of the rollers 88a-88h will be discussed further below.

Figure 10:
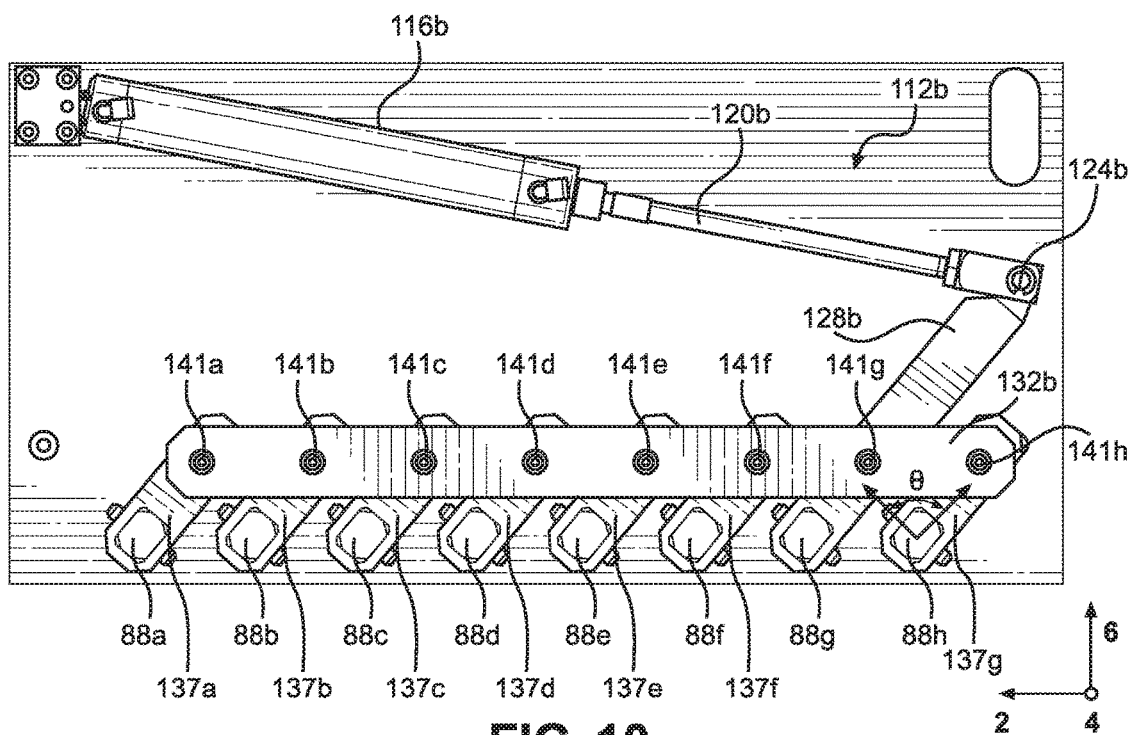
FIG. 10 is an enlarged side view of a second rotation mechanism of the distribution system shown in FIG. 2.
Figure 11:
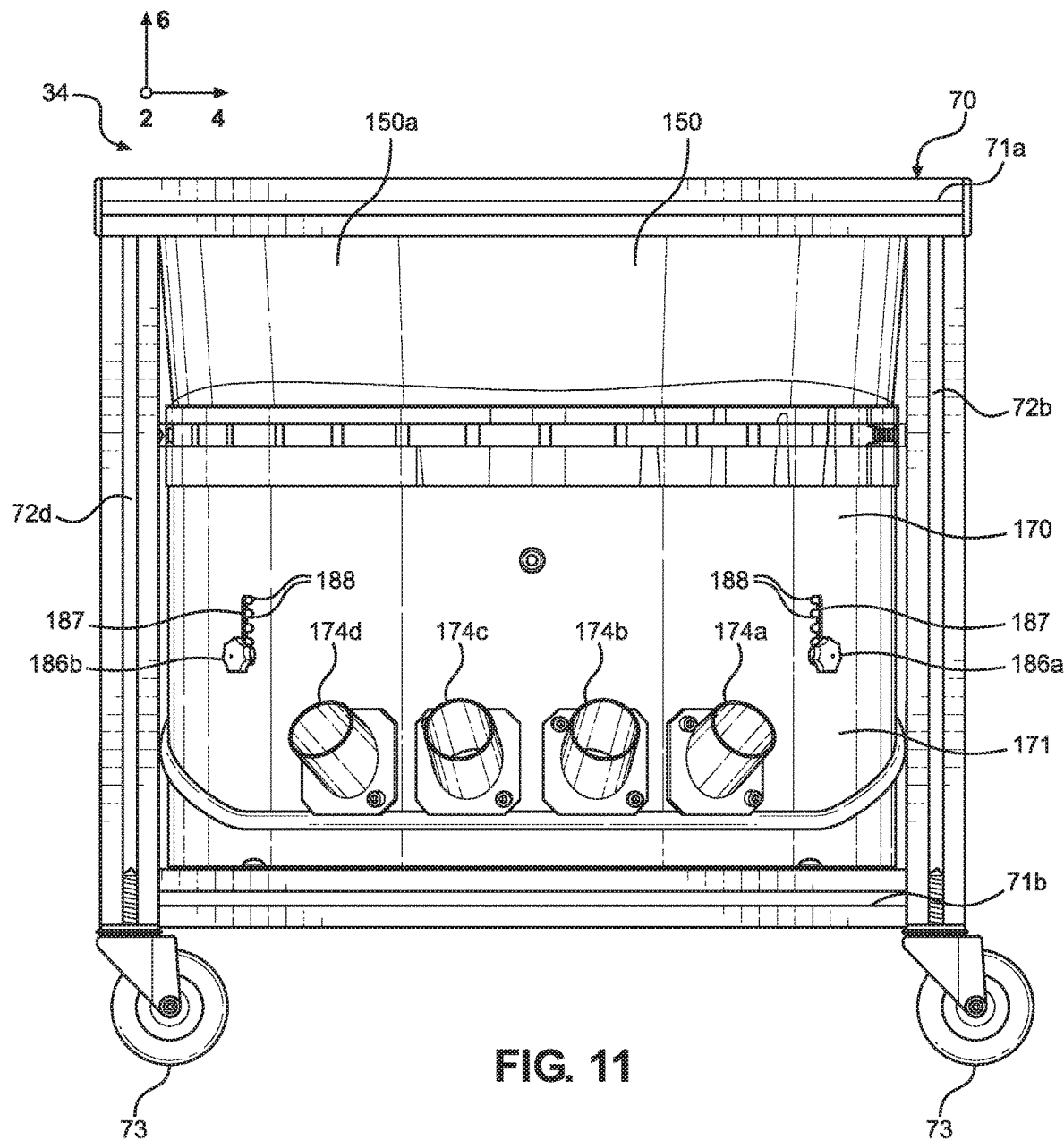
FIG. 11 is an enlarged rear view of a lower portion of the distribution system shown in FIG. 2.

In addition to the first rotation mechanism 112a, referring to FIG. 10, each of the rollers 88a-88h can be operatively connected to a second rotation mechanism 112a, which is also configured to rotate each of the rollers 88a-88h. The second rotation mechanism 112b can be attached to the outer side of the right side 61d of the hopper 60, though it is contemplated that the second rotation mechanism 112b can be attached to any of the sides 61a-61d of the hopper 60. The second rotation mechanism 112b can include a pneumatic cylinder 116b that is configured to selectively move a pneumatic ram 120b attached thereto. Though pneumatic actuation is explicitly described, the rotation mechanism can include other types of actuation mechanisms, such as hydraulically-powered devices, etc. The pneumatic ram 120b can be attached to a rotating arm 128b at a joint 124b, where the joint 124b can function as a rotational pivot between the pneumatic ram 120b and the rotating arm 128b. The rotating arm 128b can attach to the pneumatic ram 120b at one end, and the second end 92c of the seventh roller 88g at the other end. Between the pneumatic ram 120b and the seventh roller 88g, the rotating arm 128b can also attach to a lateral arm 132b that extends away from the rotating arm 128b. The lateral arm 132b can attach to the rotating arm 128b at a seventh pivot 141g, as well as a plurality of linkages 137a-137g at a plurality of respective pivots 141b-141f and 141h that are longitudinally spaced apart. For example, the lateral arm 132b can attach to a first linkage 137a at a first pivot 141a, a second linkage 137b at a second pivot 141b, a third linkage 137c at a third pivot 141c, a fourth linkage 137d at a fourth pivot 141d, a fifth linkage 137e at a fifth pivot 141e, and a sixth linkage 137f at a sixth pivot 141f, and a seventh linkage 137g at an eighth pivot 141h. Each of the rotating arm 128b, the lateral arm 132b, and the linkages 137a-137g can be configured as elongated metal bars or plates. However, other embodiments for these features are contemplated. The linkages 137a-137g can attach to the lateral arm 132b at one end, and a respective one of the rollers 88a-88f, 88h at the other end. For example, the first linkage 137a can attach to the first roller 88a, the second linkage 137b can attach to the second roller 88b, the third linkage 137c can attach to the third roller 88c, the fourth linkage 137d can attach to the fourth roller 88d, the fifth linkage 137e can attach to the fifth roller 88e, the sixth linkage 137f can attach to the sixth roller 88f, and the seventh linkage 137g can attach to the eighth roller 88h. The second rotation mechanism 112b can be contained within a transparent box 89 attached to the hopper 60, such that an operator is protected from the moving parts of the second rotation mechanism 112b, but can still visually monitor the operation of the second rotation mechanism 112b. In another embodiment, the first rotation mechanism 112a can also be contained within a transparent box 89, or neither of the first and second rotation mechanisms 112a, 112b can be contained within a transparent box 89.

To rotate the rollers 88a-88h, the pneumatic cylinder 116b of the second rotation mechanism 112b can translate the pneumatic ram 120b into and out of the pneumatic cylinder 116b. Because the pneumatic ram 120b is connected to the rotating arm 128b at the joint 124b, translation of the pneumatic ram 120b causes the rotating arm 128b to rotate about the seventh axis $A_7$ of the seventh roller 88g. Rotation of the rotating arm 128b causes the lateral arm 132b, which is attached to the rotating arm 128b, to translate along an arc-shaped path. The translation of the lateral arm 132b further causes the linkages 137a-137g to pivot about the axes $A_1$-$A_6$, $A_8$ of the respective roller 88a-88f, 88h to which they are attached. As the rollers 88a-88f, 88h are connected to the linkages 136a-136g and the rotating arm 128a is connected to the seventh roller 88g, the above described translation of the pneumatic ram 120b can cause each of the rollers 88a-88h to rotate in a uniform rotational direction. As the pneumatic ram 120b translates back and forth, the pneumatic ram 120b can cause each of the rollers 88a-88h to rotate through the rotational range Θ. This means that at one instance, each of the rollers 88a-88h can rotate together in a first rotational direction $R_1$ (counterclockwise direction), while at another instance, each of the rollers 88a-88h can rotate together in a second rotational direction $R_2$ (clockwise direction) that is opposite the first rotational direction $R_1$. The effect of the rotation of the rollers 88a-88h will be discussed further below.

Though rotation mechanisms 112a, 112b are described in connection with the distribution system 34, it is contemplated that other rotation mechanisms can be utilized. For example, the rollers 88a-88h can alternatively be driven by one or more electric motors in one or both of the rotational directions $R_1$. $R_2$. Further, the first and second rotation mechanisms 112a, 112b or other rotation mechanisms can interconnect the rollers 88a-88h so as to rotate the rollers 88a-88h through the use of gears, chains, belts, etc.

Figure 6:
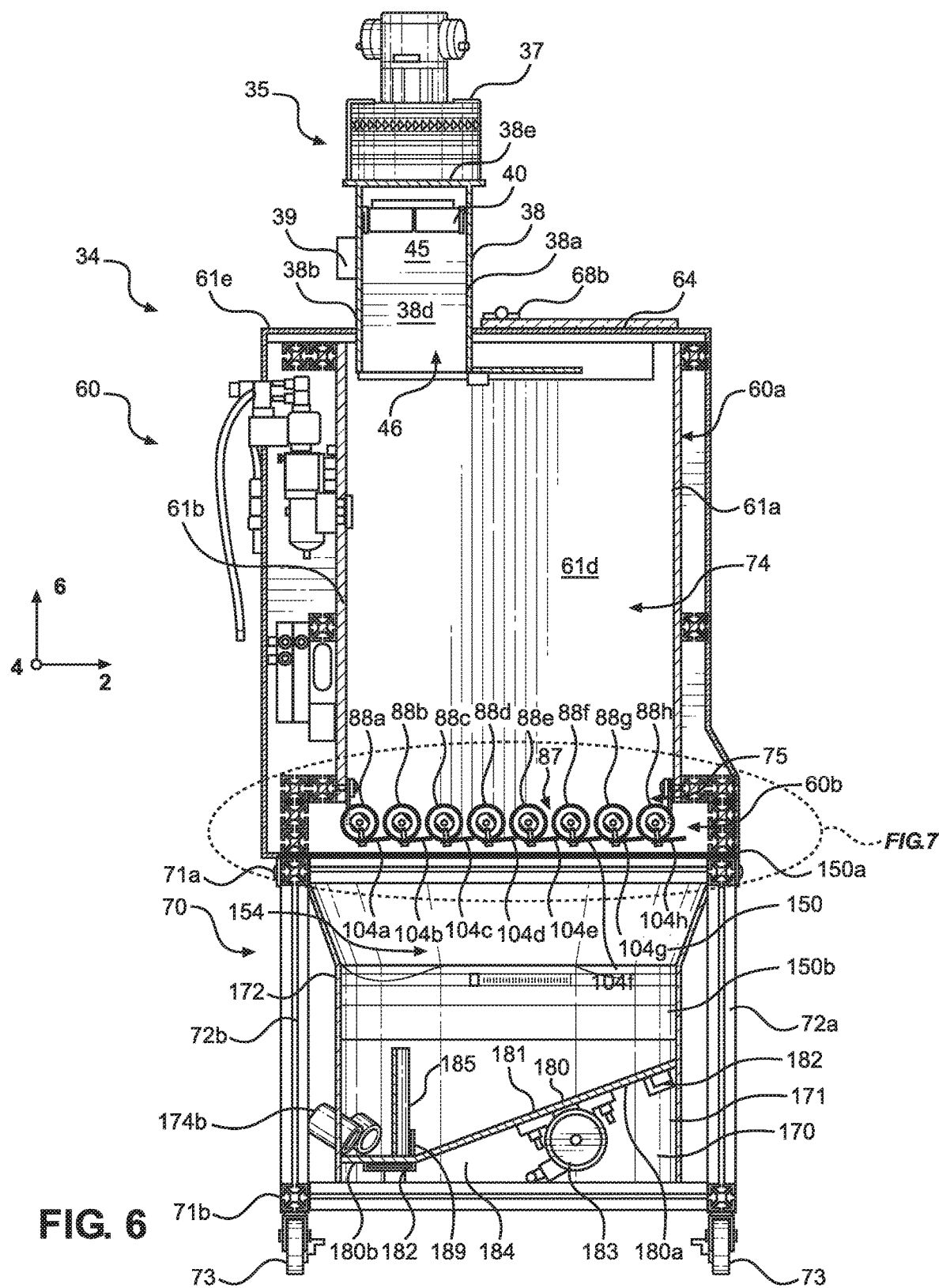
FIG. 6 is a side cross-sectional view of the distribution system shown in FIG. 2, taken along line 6-6 shown in FIG. 3.
Figure 7:
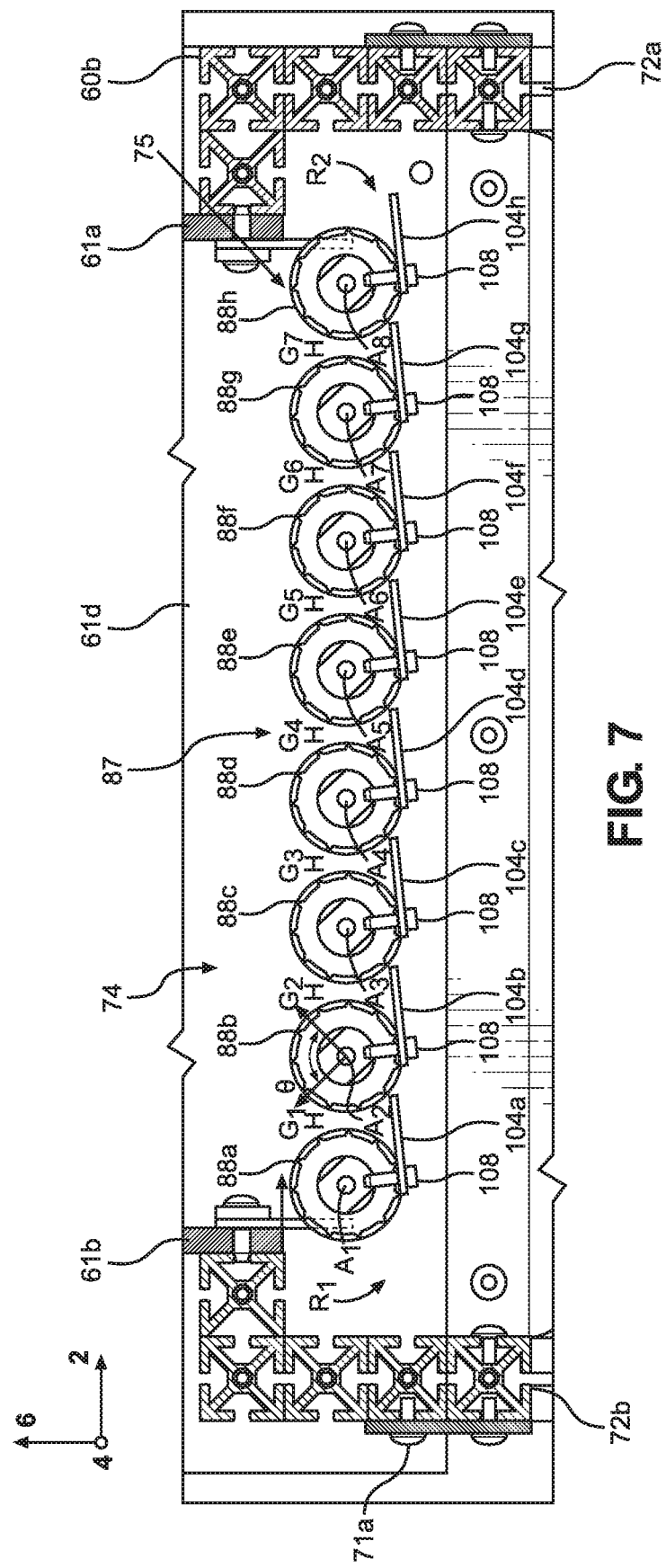
FIG. 7 is an enlarged portion of the cross-sectional view of the distribution system shown in FIG. 6.

Referring to FIGS. 6-7, the rollers 88a-88h can each be spaced apart by a predetermined amount, such that gaps $G_1$-$G_7$ are defined between the rollers 88a-88h. Specifically, a first gap $G_1$ can be defined between the first and second rollers 88a, 88b, a second gap $G_2$ can be defined between the second and third rollers 88b, 88c, a third cap $G_3$ can be defined between the third and fourth rollers 88c, 88d, a fourth gap $G_4$ can be defined between the fourth and fifth rollers 88d, 88e, a fifth gap $G_5$ can be defined between the fifth and sixth rollers 88e, 88f, a sixth gap $G_6$ can be defined between the sixth and seventh rollers 88f, 88g, and a seventh gap $G_7$ can be defined between the seventh and eighth rollers 88g, 88h. Each of the gaps $G_1$-$G_7$ can be defined as the open channel that extends downward from the cavity 74 of the hopper 60 between the rollers 88a-88h. Each of the gaps $G_1$-$G_7$ can be equal in width, though any of the gaps $G_1$-$G_7$ can differ from the other gaps in size as desired. In one embodiment, each of the gaps $G_1$-$G_7$ can be about 0.375 inches wide. Alternatively, the gaps $G_1$-$G_7$ can be from about 0.200 inches to about 0.500 inches wide. However, other widths for the gaps $G_1$-$G_7$ are contemplated. The width of the gaps $G_1$-$G_7$ in a particular distribution system 34 can be specifically designed to accommodate a material having a particular size and/or shape in a solid state, or a particular amount of material flow required by a specific melter. Specifically, the gaps $G_1$-$G_7$ can be designed such that when the rollers 88a-88h are in a stationary position, the rollers 88a-88h block flow through the gaps $G_1$-$G_7$, but when the rollers 88a-88h are moving, the relative motion between the rollers 88a-88h creates enough disturbance in the bottom-most layer of material such that the material flows through the gaps $G_1$-$G_7$. As noted above, each of the gates 104a-104h can be moved so as to adjust the position of the gates 104a-104h with respect to the respective roller 88a-88h to which they are attached. This movement can aid in restricting or permitting flow through the gaps $G_1$-$G_7$ through which the gate 104a-104h extends.

In operation, the cavity 74 of the hopper 60 can be filled with material, such as a hot melt adhesive. In a distribution system 34 that includes a plurality of rollers 88a-88h, the material can rest on the upper side of the rollers 88a-88h before it is transferred to the distribution bin 170, which will be discussed below. Without any motion, the physical properties of the material can prevent the material from passing through the gaps $G_1$-$G_7$ defined between the rollers 88a-88h, and thus the supply of material bridges over the rollers 88a-88h. To transfer selective amounts of the material from the hopper 60 to the distribution bin 170, the first rotation mechanism 112a can rotate the conveyor 87, which in this embodiment is the rollers 88a-88h, about their respective axes $A_1$-$A_8$ through the rotational range $\Theta$. This clockwise and counterclockwise rotation of the rollers 88a-88h agitates and fluidizes discrete amounts of the material, which then falls through the gaps $G_1$-$G_7$. It is contemplated the speed and/or rotational range $\Theta$ at which the rollers 88a-88h rotate can be adjusted so as to increase or decrease the rate of fluidization of the material. Further, as noted above, the position of the gates 104a-104h can be adjusted relative to the rollers 88a-88h to adjust the width of the lower-most portion of the gaps $G_1$-$G_7$. The position of the gates 104a-104h can be adjusted together, or the position of any one of the gates 104a-104h can be adjusted separate from the others.

Figure 12:
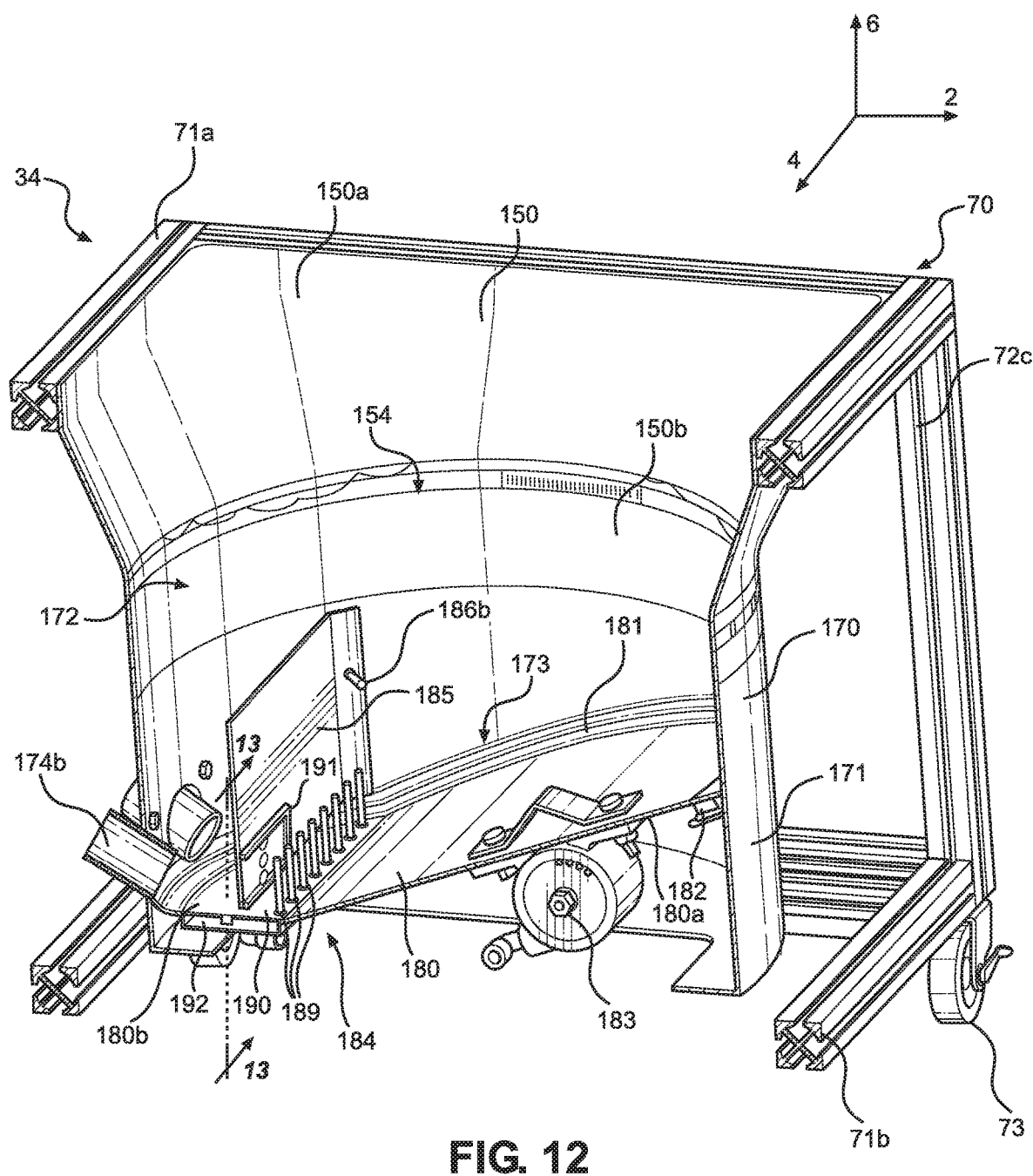
FIG. 12 is a side cross-sectional view of the distribution system shown in FIG. 2; taken along line 12-12 shown in FIG. 2.
Figure 13:
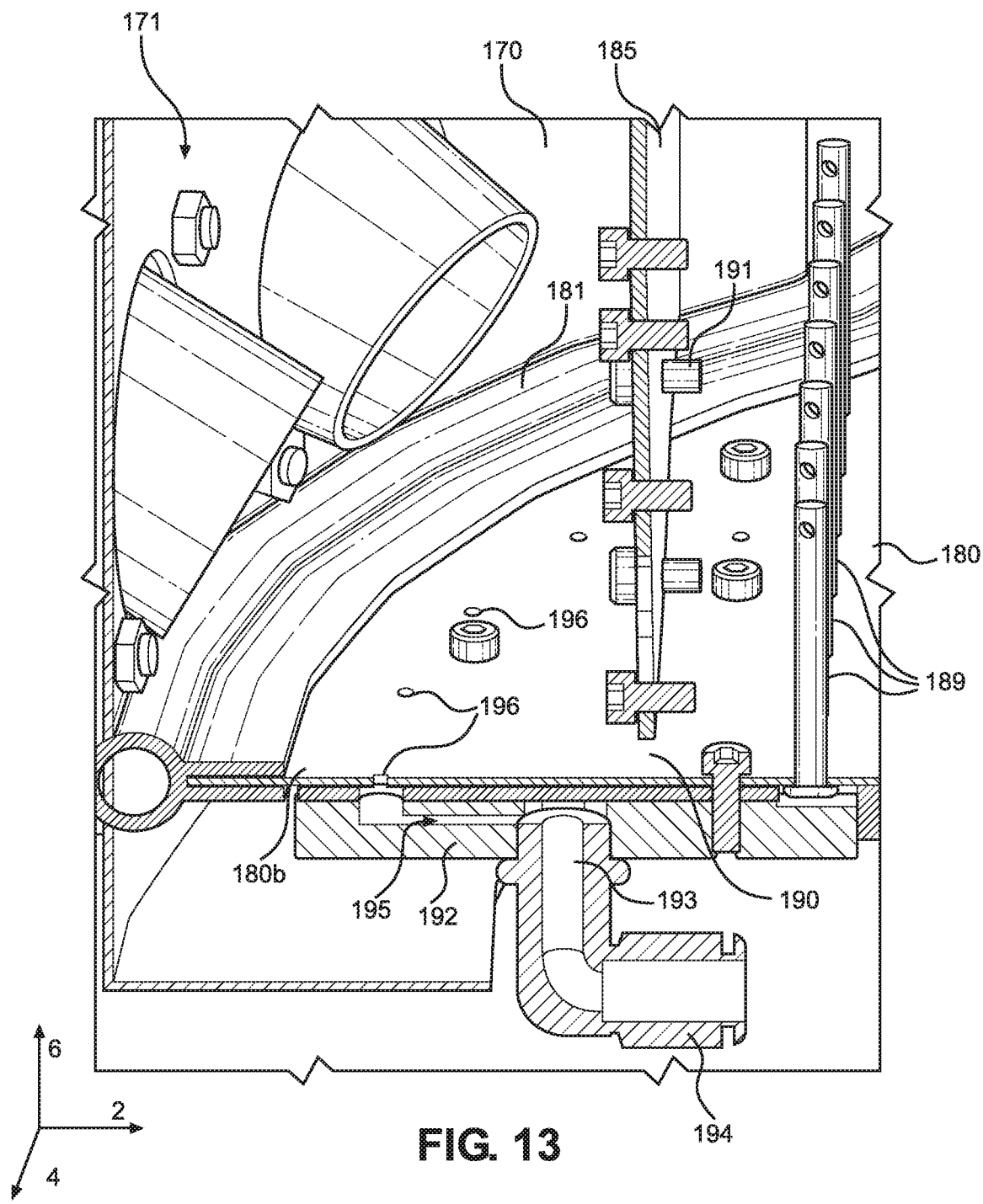
FIG. 13 is an enlarged portion of the cross-sectional view of the distribution system shown in FIG. 12.
Figure 14:
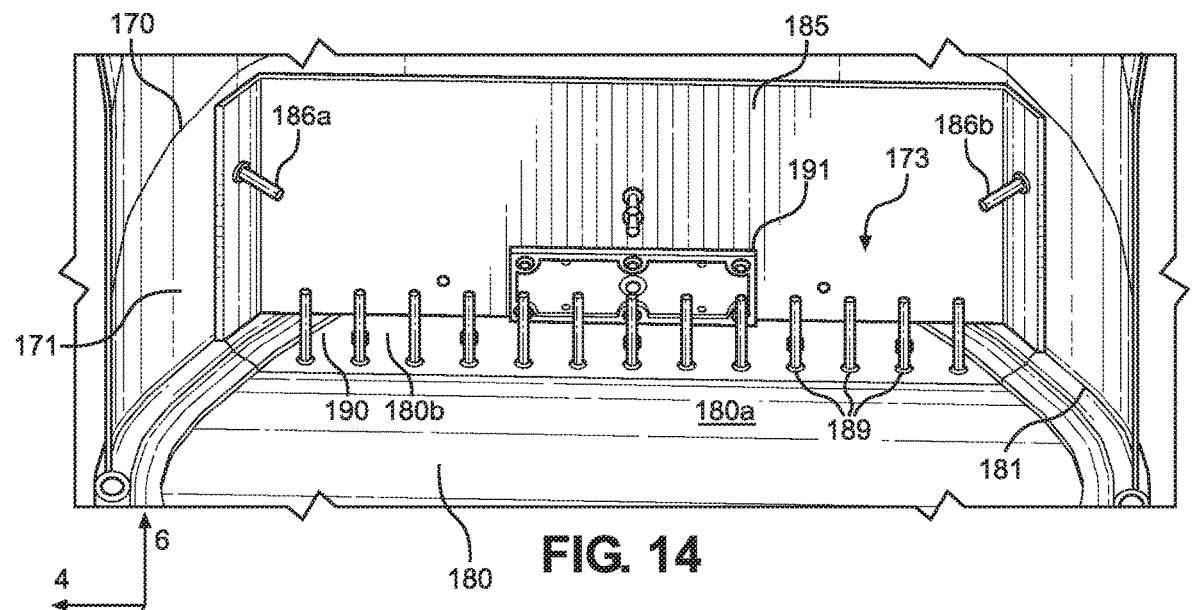
FIG. 14 is a rear cross-sectional view of the distribution system shown in FIG. 2, taken along line 14-14 shown in FIG. 2.
Figure 15:
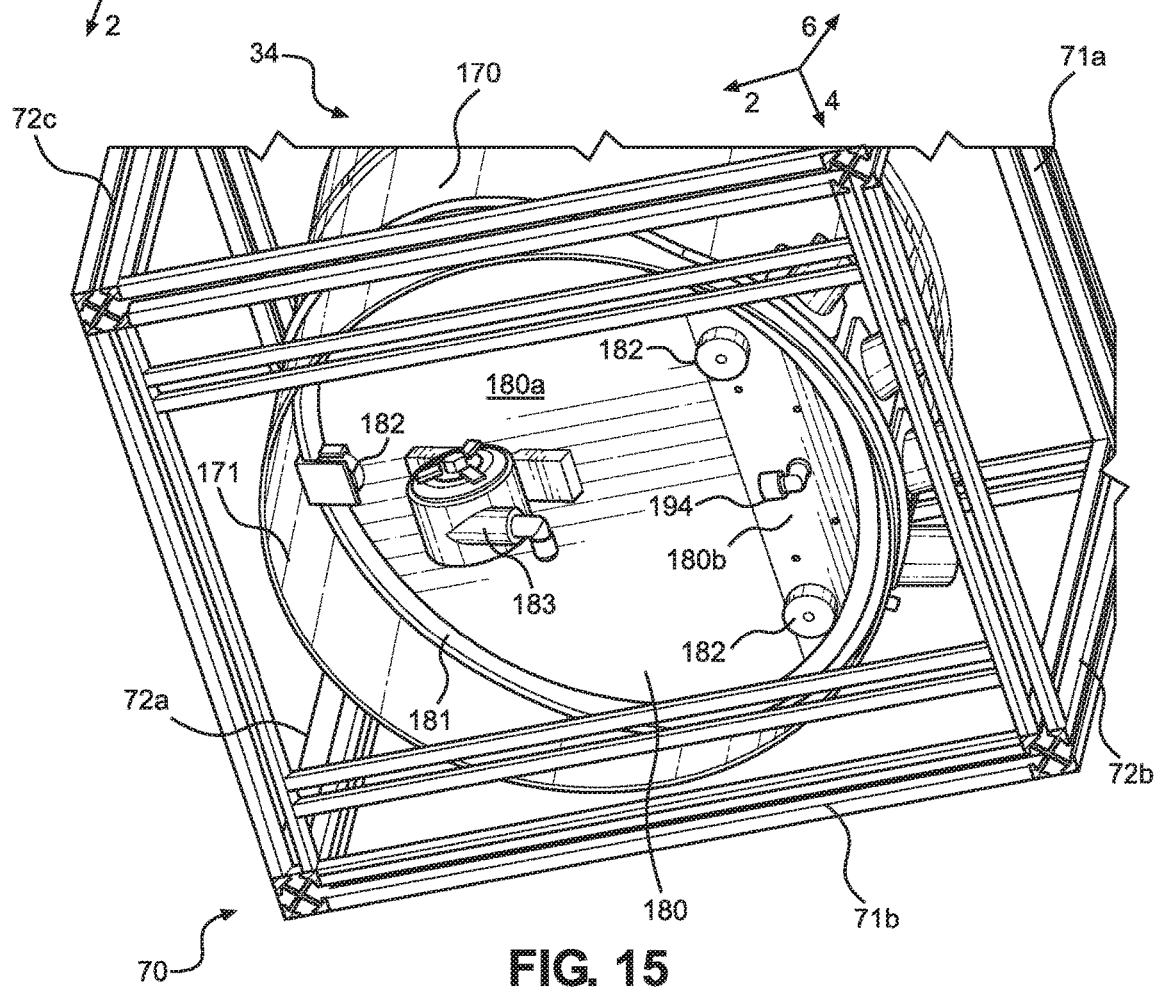
FIG. 15 is an upper cross-sectional view of the distribution system shown in FIG. 2, taken along line 15-15 shown in FIG. 3.

Now referring to FIG. 12, the funnel 150 and distribution bin 170 will be discussed in detail. The funnel 150 can function as a transition for the material as it flows from the hopper 60 to the distribution bin 170. The funnel 150 can have an upper end 150a that is attached to the top frame 71a of the base 70, and a lower end 150b opposite the upper end 150a along the vertical direction 6 that is attached to the distribution bin 170. A passage 154 is defined through the funnel 150 from the upper end 150a to the lower end 150b to allow for the transfer of the material. The funnel 150 can comprise a flexible material, such as a fabric, which allows relative movement between the hopper 60 and the distribution bin 170. The funnel 150 can taper inwards from the upper end 150a to the lower end 150b, thus guiding the material as it is transferred from the hopper 60 to the distribution bin 170. However, it is contemplated that the funnel 150 can comprise different shapes and/or materials, or that the funnel 150 may not be included in the distribution system 34 at all, in which case the distribution bin 170 can be attached directly to the hopper 60.

The distribution bin 170 is configured to receive and hold a supply of the material from the conveyor 87 and allow for the material to be selectively provided to one or more melters 26a-26d on demand. As depicted, the distribution bin 170 is positioned within the distribution system 34 below the hopper 60 and funnel 150, as well as between the top and bottom frames 71a, 71b of the base 70. However, other positions for the distribution bin 170 are contemplated. The distribution bin 170 includes a housing 171, an inlet 172, an internal chamber 173 configured to receive the material from the conveyor 87, and at least one outlet. The housing 171 can define a substantially circular cross-section, which eliminates corners in which material can cluster and stagnate. Likewise, the internal chamber 173 defined by the housing 171 can define a substantially circular cross-section. The inlet 172 is open to the funnel 150 and is configured to receive the material from the conveyor 87 through the passage 154, while the internal chamber 173 is configured to receive the material from the inlet 172. After passing through the internal chamber 173, as will be described below, the material is provided to at least one outlet in fluid communication with at least one melter. For example, the depicted distribution bin 170 includes a first outlet 174a, a second outlet 174b, a third outlet 174c, and a fourth outlet 174d. Though four outlets are specifically shown, the distribution bin 170 can include any number of outlets as desired. Further, in operation any combination of the outlets 174a-174d can be plugged or otherwise closed off, such that they prevent possible contamination of the material and remain unused in a particular dispensing operation. Each of the outlets 174a-174d can be in fluid communication with a transfer pump (not shown) for pumping the material from the distribution bin 170 through the outlets 174a-174d to the respective melters.

The distribution bin 170 can include a plate 180 surrounded by the housing 171 and configured to direct adhesive particulate contained therein toward the outlets 174a-174d. The plate 180 can define a lower end of the internal chamber 173, such that material falling into the distribution bin 170 from the hopper 60 can be supported by the plate 180. The plate 180 can comprise a sloped portion 180a and a lower portion 180b, where the lower portion 180b can be positioned adjacent the outlets 174a-174d, and the sloped portion 180a can be angularly offset from the lower portion 180b and extend upwards and longitudinally away from the lower portion 180b. The sloped portion 180a, due to its orientation, can be configured to direct the material to flow downwards to the lower portion 180b. An agitation device 183 can be operatively coupled with the plate 180 and configured to transfer force to the plate 180 such that the plate agitates material particulates disposed thereon, which encourages flow of the material down the plate 180 and to the outlets 174a-174d. In the depicted embodiment, the agitation device 183 is coupled to the bottom of the plate 180, though other positions for the agitation device are contemplated. In some embodiments, the agitation device 183 may be configured to vibrate the plate 180, although other types of agitation may be used in other embodiments of the distribution bin 170.

The distribution bin 170 can further include a gasket 181 disposed around at least a portion of the plate 180 and positioned between plate 180 and the housing 171. The gasket 181 can be comprised of a substantially flexible and force-absorbing material, such that the gasket 181 is configured to absorb excess vibration created in the plate 180 by the agitation device 183 and prevent material from falling between the plate 180 and the housing 171. In addition to the gasket 181, the distribution bin 170 can include at least one bumper 182 attached to the bottom surface of the plate 180. Like the gasket 181, the at least one bumper 182 can be comprised of a substantially flexible and force-absorbing material. In the depicted embodiment, the distribution bin 170 includes three bumpers 182—two attached to the lower portion 182b of the plate 180 and one attached to the sloped portion 182a of the plate 180, though other configurations and number of bumpers 182 are contemplated. Together, the gaskets 181 and the bumpers 182 are configured to prevent the plate 180 from transferring force created by the agitation device 183 to other components of the distribution system 34, thus preventing further wear or damage on any such components.

The housing 171 of the distribution bin 170 can include an access window 184 that extends through its bottom side so as to provide the operator with access to the agitation device 183. In the depicted embodiment, the access window 184 is depicted as having a substantially round shape, though other shapes are contemplated. The distribution bin 170 can also include a level sensor 191 for detecting the amount of material within the internal chamber 173 of the distribution bin 170. The level sensor 191 can be in wired and/or wireless communication with the controller 30 for communication of level readings from the level sensor 191. When the level sensor 191 detects the level of material within the distribution bin 170 is low, the controller 30 can direct the conveyor 87 to actuate so as to cause more of the material be transferred from the hopper 60 to the distribution bin 170.

The distribution bin 170 can further include a flow control plate 185 attached to an inner surface of the housing 171. The flow control plate 185 can be configured as a flat, substantially planar metallic plate, though the present disclosure is not intended to be limited to such. The flow control plate 185 can extend laterally through the internal chamber 173 and can be spaced from the plate 180, and specifically the lower portion 180b of the plate 180, so as to define a gap 190 between the flow control plate 185 and the plate 180. As a result, the flow control plate 185 can function to restrict the flow of material to the outlets 174a-174d of the distribution bin 170. In the depicted embodiment, the level sensor 191 is attached to the flow control plate 185. Alternatively, the level sensor 191 can be attached to the inner surface of the housing 171.

The flow control plate 185 can be movable along the vertical direction 6 so as to adjust the size of the gap 190. In the depicted embodiment, the distribution bin 170 can include a first pin 186a attached to a first end of the flow control plate 185 and a second pin 186b attached to the opposite end of the flow control plate 185. The first and second pins 186a, 186b can also extend through respective slots 187 defined by the housing 171. In one embodiment, the first and second pins 186a, 186b are attached to the plate by inserting portions of the first and second pins 186a, 186b through the respective slots 187 and threadedly attaching the first and second pins 186a, 186b to the flow control plate 185. However, other methods of attaching the first and second pins 186a, 186b to the flow control plate are contemplated. Each of the slots 187 can define elongated slots that extend substantially vertically through the housing 171, though other shapes and orientations of the slots 187 are contemplated. Each of the first and second pins 186a, 186b is configured to be selectively moved through the respective slot 187 so as to vertically move the flow control plate 185 within the internal chamber 173, thus adjusting the size of the gap 190. The force applied to the first and second pins 186a, 186b to make these adjustments can be applied to the first and second pins 186a, 186b external to the housing 171. This can be advantageous for the operator of the distribution system 34, as it allows the operator to easily, accurately, and manually make changes to the size of the gap 190 without disassembling or coming into contact with any of the internal features of the distribution bin 170. To secure the flow control plate 185 in a desired position, the housing 171 can define a plurality of notches 188 open to each of the slots 187. The notches 188 can be positioned vertically along the slots 187 in set increments, so as to correspond to defined sizes of the gaps 190. As such, the housing 171 can include external markings to inform the operator which gap sizes each of the notches 188 corresponds to. In operation, when each of the first and second pins 186a, 186b is moved through the corresponding slot 187 to a desired location, the operator can dispose the first and second pins 186a, 186b into respective ones of the notches 188 so as to secure the flow control plate 185 in the desired position.

The plate 180 can include a plurality of pins 189 extending upwards in the proximity of the end of the flow control plate 185. In the depicted embodiment, the plate 180, and particularly the lower portion 180b of the plate 180, can have a single laterally-extending row of pins 189. Though pins having particular arrangements and lengths are shown, the plate 180 can include more pins, less pins, pins of different lengths, no pins, etc. The pins 189 can function to, along with the vibration/agitation generated by the agitation device 183, divide the flow of material within the distribution bin 170 so as to break apart clumps of coalesced and/or stuck together material particulates before delivery to the outlets 174a-174d. In operation, the material received by the internal chamber 173 can be directed along the sloped portion 180a of the plate 180, past the pins 189, through the gap 190, to the lower portion 180b of the plate 180, and to the outlets 174a-174d. Once provided to the outlets 174a-174d, the material can be conveyed through the outlets 174a-174d by respective pumps to a corresponding one of the melters.

In addition to the pins 189, the distribution system 34 can also include a manifold 192 configured to avoid the formation of clumps of material, particularly near the outlets 174a-174d. The manifold 192 can be positioned below the plate 180 and attached to the bottom surface of the plate 180, specifically the lower portion 180b of the plate 180. The manifold 192 can be configured to receive pressurized air and force pressurized air through at least one passage 196 extending through the lower portion 180b of the plate 180 so as to move material within the internal chamber 173. To accomplish this, the manifold 192 can include an input 193 configured to receive the pressurized air from an external pressurized air source (not shown). The distribution system 34 can further include an input connector 194 configured to interface with the input 193 of the manifold 192 so as to provide the manifold 192 with pressurized air. Though depicted as an elbow adapter, the input connector 194 can comprise any suitable device for interfacing with a hose or other components capable of directing pressurized air from a pressurized air source.

The manifold 192 can further include a body passage 195 that extends through the manifold 192. The body passage 195 can extend into the manifold 192 from its upper surface, such that when the manifold 192 is attached to the plate 180, the body passage 195 can be partially defined by the manifold 192 and partially defined by the plate 180. However, in other embodiments, the body passage 195 can be extend completely internally through the manifold 192. As stated above, the body passage 195 can be configured to direct the pressurized air to at least one passage 196 extending through the plate 180. In the depicted embodiment, the plate 180 defines a plurality of passages 196 that are positioned on the plate 180 in a substantially arc-like shape adjacent the outlets 174a-174d, particularly in a shape that substantially matches the curvature of the housing 171. However, other shapes, arrangements, or numbers of passage 196 are contemplated. In operation, pressurized air is directed from a pressurized air source, through the input connector 194, through the input 193 of the manifold 192, into the body passage 195, and through the body passage 195 to the at least one passage 196. From the at least one passage 196, the air is directed through the plate 180 so as to move material within the internal chamber 173. By providing this pressurized air input to the internal chamber 173, particularly to the portion of the internal chamber 173 adjacent the outlets 174a-174d, clumping and stagnation of the material can be prevented. This can be advantageous in that clumping of the material can otherwise clog the outlets 174a-174d, which can force the operator to halt dispensing operations to as to address the issue, resulting in both wasted time and resources.

Figure 16:
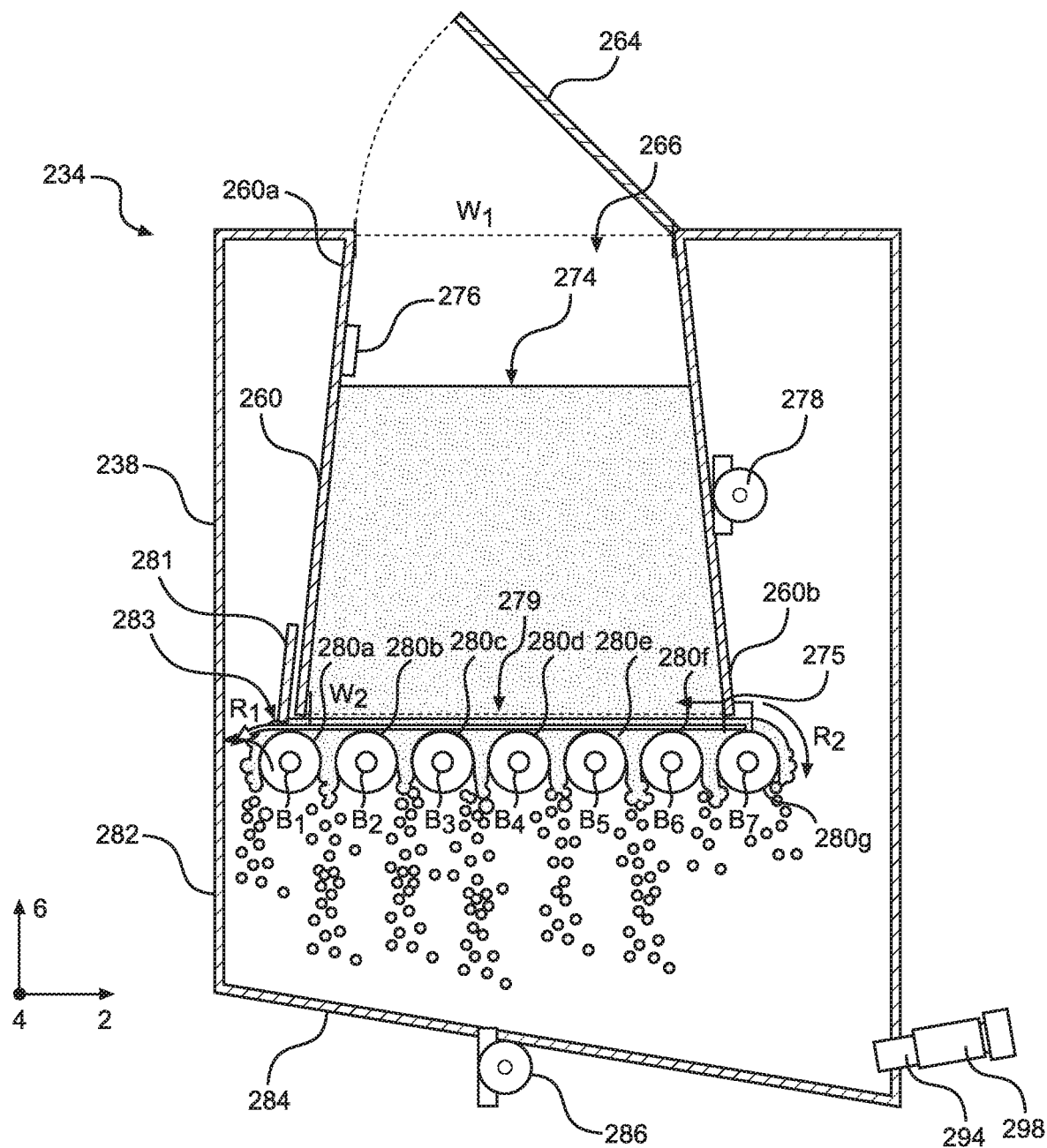
FIG. 16 is a schematic view of a distribution system of the application system shown in FIG. 1A according to another embodiment of the present disclosure.

Now referring to FIG. 16, another embodiment of a distribution system 234 will be discussed. The distribution system 234 includes an outer housing 238 that defines an internal space and a hopper 260 positioned in the internal space of the housing 238. The hopper 260 can extend from an upper end 260a to a lower end 260b opposite the upper end 260a along the vertical direction 6. An opening 266 can be defined in the upper end 260a for receiving the material 275 and filling the hopper 260. The distribution system 234 can include a lid 264 coupled to the housing 238 for selectively providing access to the hopper 260 and covering the hopper opening 266. The upper end 260a of the hopper 260 can have a first width $W_1$ measured along the lateral direction 4 and the lower end 260b of the hopper 260 can have a second width $W_2$ measured along the lateral direction 4, where the second width $W_2$ is greater than the first width $W_1$. As such, the hopper 260 can taper outwards as it extends downward along the vertical direction 6. However, it is also contemplated that the upper end 260a and the lower end 260b can have similar widths, or the lower end 260b can have a smaller width than the upper end 260a, such that the hopper 260 tapers inwards as it extends downwards along the vertical direction 6.

The hopper 260 can define a cavity 274 therein for receiving the material 275 through the opening 266 and storing the material. The distribution system 234 can include an agitation device 278 for agitating material particulates disposed within the hopper 260 so as to encourage flow of the material downwards within the cavity 274. In the depicted embodiment, the agitation device 278 is coupled to the outer surface of the hopper 260, though other positions for the agitation device are contemplated. In some embodiments, the agitation device 278 may be configured to vibrate the hopper 260 so as to provide vibrational energy to the material within the hopper 260, although other types of agitation may be used in other embodiments of the distribution system 234. The distribution system 234 can also include a level sensor 276 attached to the inner surface of the hopper 260 for sensing a level of the material 275 in the hopper 260. The level sensor 276 can be in signal communication with the controller 30, such that an operator of the distribution system 234 can be notified in real time if the supply of material 275 in the hopper 260 becomes depleted, or other parts of the application system 10 can be notified to automatically replenish the supply of material within the hopper 260.

Adjacent the lower end 260b of the hopper 260, the distribution system 234 includes a conveyor 279. In the embodiment depicted in FIG. 8, the conveyor 279 includes a plurality of rollers 280a-280g. Specifically, the conveyor 279 can include a first roller 280a, second roller 280b, third roller 280c, fourth roller 280d, fifth roller 280e, sixth roller 280f, and seventh roller 280g. Each of the rollers 280a-280g can extend through the distribution system 234 substantially along the lateral direction 4. However, it is contemplated that in other embodiments the rollers 280a-280g may not extend parallel to each other, or may extend along a direction other than the lateral direction 4. In any event, the rollers 280a-280g will generally extend along a direction that is perpendicular to the vertical direction 6. Despite the fact that the conveyor 279 is shown to include seven rollers 280a-280g, the conveyor 279 can include more or less than seven rollers. For example, in other embodiments the conveyor 279 can include one roller, two rollers, three rollers, or more than seven rollers. Alternatively, in other embodiments the conveyor 279 can include a sifter in place of the rollers 280a-280g. Each of the rollers 280a-280g can have a similar structure to the first roller 88a shown in FIGS. 5A-5B, with the exception that the rollers 280a-280g may not include a gate 104a-104g. Additionally, each of the rollers 280a-280g can be spaced apart so to define gaps that extend vertically therebetween. Each of the rollers 280a-280g is configured to rotate about a respective axis. For example, the first roller 280a can rotate about a first axis $B_1$, the second roller 280b can rotate about a second axis $B_2$, the third roller 280c can rotate about a third axis $B_3$, the fourth roller 280d can rotate about a fourth axis $B_4$, the fifth roller 280e can rotate about a fifth axis $B_5$, the sixth roller 280f can rotate about a sixth axis $B_6$, and the seventh roller 280g can rotate about a seventh axis $B_7$. Like the rollers 280a-280g, each of the axes $B_1$-$B_7$ can extend along the lateral direction 4. However, all of the axes $B_1$-$B_7$ can extend along any direction that is perpendicular to the vertical direction 6.

Each of the rollers 280a-280g can be configured to rotate through an angular rotational range about its respective axis $B_1$-$B_7$. This rotation can be driven by a rotation mechanism, such as the first and second rotation mechanisms 112a, 112b shown in FIGS. 9-10, though other types of rotation mechanisms are contemplated. As such, each of the rollers 280a-280g can be rotated in either of the first or second rotational directions $R_1$, $R_2$. The distribution system 234 can also include a gate 281 attached to the lower end 260b of the hopper 260. A gap 283 can be defined between the gate 281 and the conveyor 279, in particular between the gate 281 and the first rollers 280a, where select amounts of the material are configured to pass through the gap 283. The gate 281 can be movably connected to the hopper 260 and thus movable relative to the conveyor 279, which allows an operator of the distribution system 234 to adjust a size of the gap 283. The size of the gap 283 can be adjusted by raising or lowering the gate 281 so as to control the amount of material flowing through the gap 283 from the hopper 260.

In operation, the cavity 274 of the hopper 260 can be filled with material, such as a hot melt adhesive. In a distribution system 234 that includes a plurality of rollers 280a-280g, the material can rest on the upper side of the rollers 280a-280g before it is transferred to the distribution bin 282, which will be discussed below. Without any motion, the physical properties of the material can prevent the material from passing through the gap 283 defined between the gate 281 and the conveyor 279 or through the gaps defined between the rollers 280a-280g, and thus the supply of material bridges over the rollers 280a-280g. To transfer selective amounts of the material from the hopper 260 to the distribution bin 282, the first rotation mechanism 112a can rotate the conveyor 279, which in an embodiment comprises the rollers 280a-280g, about their respective axes $B_1$-$B_7$. The clockwise and counterclockwise rotation of the rollers 280a-280g agitates and fluidizes discrete amounts of the material, which then falls from the hopper 260 to the distribution bin 282. The speed at which the rollers 280a-280g rotate can be adjusted so as to increase or decrease the rate of fluidization of the material. Further, as noted above, the position of the gate 281 can be adjusted relative to the conveyor 279 to adjust the size of the gap 283.

Continuing with FIG. 16, the distribution bin 282 will be described in detail. The distribution bin 282 can be configured to receive and hold a supply of the material from the conveyor 279. As depicted, the distribution bin 282 can be integrally connected to the housing 238, though it is contemplated that they can be separate components. The distribution bin 282 is positioned below the hopper 260, such that the distribution bin 282 can receive material fluidized by the conveyor 279. The distribution bin 282 can include a sloped plate 284 at its bottom that guides the material transferred from the hopper 260 to one or more outlets 294 that are in communication with one or more of the melters. Though one outlet 294 is specifically shown, the distribution system 234 can include a plurality of outlets. The outlet 294 can be in fluid communication with a transfer pump 298 for pumping the material from the distribution bin 282, through the outlet 294, and to the respective melters.

As noted above, the distribution bin 282 can include a plate 284 configured to direct adhesive particulate toward the outlet 294. An agitation device 286 can be operatively coupled to the plate 284 for agitating material particulates disposed thereon so as to encourage flow of the material down the plate 284 and to the outlet 294. In the depicted embodiment, the agitation device 286 is coupled to the bottom of the plate 284, though other positions for the agitation device are contemplated. In some embodiments, the agitation device 286 may be configured to vibrate the plate 284, although other types of agitation may be used in other embodiments of the distribution bin 282.

Now referring to FIG. 17, another embodiment of a distribution system 334 will be discussed. The distribution system 334 includes an outer housing 338 that defines an internal space and a hopper 360 positioned in the internal space of the housing 338. The hopper 360 can extend from an upper end 360a to a lower end 360b opposite the upper end 360a along the vertical direction 6. An opening 366 can be defined in the upper end 360a for receiving the material and filling the hopper 360. The distribution system 334 can include a lid 364 coupled to the housing 338 for selectively providing access to the hopper 360 and covering the hopper opening 366. The upper end 360a of the hopper 360 can have a first width $W_3$ measured along the lateral direction 4 and the lower end 360b of the hopper 360 can have a second width $W_4$ measured along the lateral direction 4, where the second width $W_4$ is greater than the first width $W_3$. As such, the hopper 360 can taper outwards as it extends downward along the vertical direction 6. However, it is also contemplated that the upper end 360a and the lower end 360b can have similar widths, or the lower end 360b can have a smaller width than the upper end 360a, such that the hopper 360 tapers inwards as it extends downwards along the vertical direction 6.

The hopper 360 can define a cavity 374 therein for receiving the material through the opening 366 and storing the material. The distribution system 334 can include an agitation device 377 for agitating material particulates disposed within the hopper 360 so as to encourage flow of the material downwards within the cavity 374. In the depicted embodiment, the agitation device 377 is coupled to the outer surface of the hopper 360, though other positions for the agitation device are contemplated. In some embodiments, the agitation device 377 may be configured to vibrate the hopper 360 so as to provide vibrational energy to the material within the hopper 360, although other types of agitation may be used in other embodiments of the distribution system 334. The distribution system 334 can also include a level sensor 376 attached to the inner surface of the hopper 360 for sensing a level of the material in the hopper 360. The level sensor 376 can be in signal communication with the controller 30, such that an operator of the distribution system 334 can be notified in real time if the material level in the hopper 360 becomes depleted, or other parts of the application system 10 can be notified to automatically replenish the supply of material within the hopper 360.

Adjacent the lower end 360b of the hopper 360, the distribution system 334 includes a conveyor 378. In the embodiment depicted in FIG. 9, the conveyor 378 includes a conveyor belt 379. The conveyor belt 379 can comprise a continuous belt that is translated about first and second wheels 380a, 380b, where each of the first and second wheels 380a, 380b engage an inner surface of the conveyor belt 379 and are disposed at opposite ends of the conveyor belt 379. Though two wheels 380a, 380b are shown, the conveyor 378 can include more or less than two wheels. For example, in other embodiments the conveyor 378 can include one wheel, three wheels, or four or more wheels. The first wheel 380a can be configured to rotate about a first axis $C_1$, while the second wheel 380b can be configured to rotate about a second axis $C_2$, where each of the axis $C_1$, $C_2$ can extend substantially along the lateral direction 4. The first and second wheels 380a, 380b can be configured to rotate about the respective first and second axis $C_1$, $C_2$ in either of the first or second rotational directions $R_1$, $R_2$ as desired. However, each of the axes $C_1$, $C_2$ can extend along any direction that is perpendicular to the vertical direction 6. One or both of the wheels 380a, 380b can be driven by a gear motor or other similar power source (not shown), and likewise transfer the rotation to the attached conveyor belt 379.

The distribution system 334 can also include a gate 381 attached to the lower end 360b of the hopper 360. A gap 383 can be defined between the gate 381 and the conveyor 378, in particular between the gate 381 and the conveyor belt 379, where select amounts of the material are configured to pass through the gap 383. The gate 381 can be movably connected to the hopper 360 and thus movable relative to the conveyor 378, which allows an operator of the distribution system 334 to adjust a size of the gap 383. The size of the gap 383 can be adjusted by raising or lowering the gate 381 so as to control the amount of material flowing through the gap 383 from the hopper 360.

In operation, the cavity 374 of the hopper 360 can be filled with material, such as hot melt adhesive. In a distribution system 334 that includes a conveyor belt 379, the material can rest on the upper side of the conveyor belt 379 before it is transferred to the distribution bin 382, which will be discussed below. Without any motion, the physical properties of the material can prevent the material from passing through the gap 383 defined between the gate 381 and the conveyor belt 379, and thus the supply of material bridges over the gap 383. To transfer selective amounts of the material from the hopper 360 to the distribution bin 382, the first and second wheels 380a, 380b can rotate about their respective axes $C_1$, $C_2$ to translate the conveyor belt 379. Translation of the conveyor belt 379 agitates and fluidizes discrete amounts of the material along a shear plane S at the lower end 360b of the hopper 360, which causes the fluidized material to translate with the conveyor belt 379 and through the gap 383. In the depicted embodiment, the shear plane S extends substantially perpendicular to the vertical direction 6, though this may differ in other embodiments. However, the shear plane S will generally be parallel to the upper surface of the conveyor belt 379. The speed at which the wheels 380a, 380b rotate can be adjusted, such that the conveyor belt 379 can be moved at a range of speeds to adjust the rate of fluidization of the material or to accommodate different types of amounts of material. Further, as noted above, the position of the gate 381 can be adjusted relative to the conveyor belt 379 to adjust the size of the gap

383. Though depicted as having a substantially smooth surface, the conveyor belt 379 can have a plurality of protrusions extending from its outer surface that allow the conveyor belt 379 to have greater traction on the material in the hopper 360.

Figure 17:
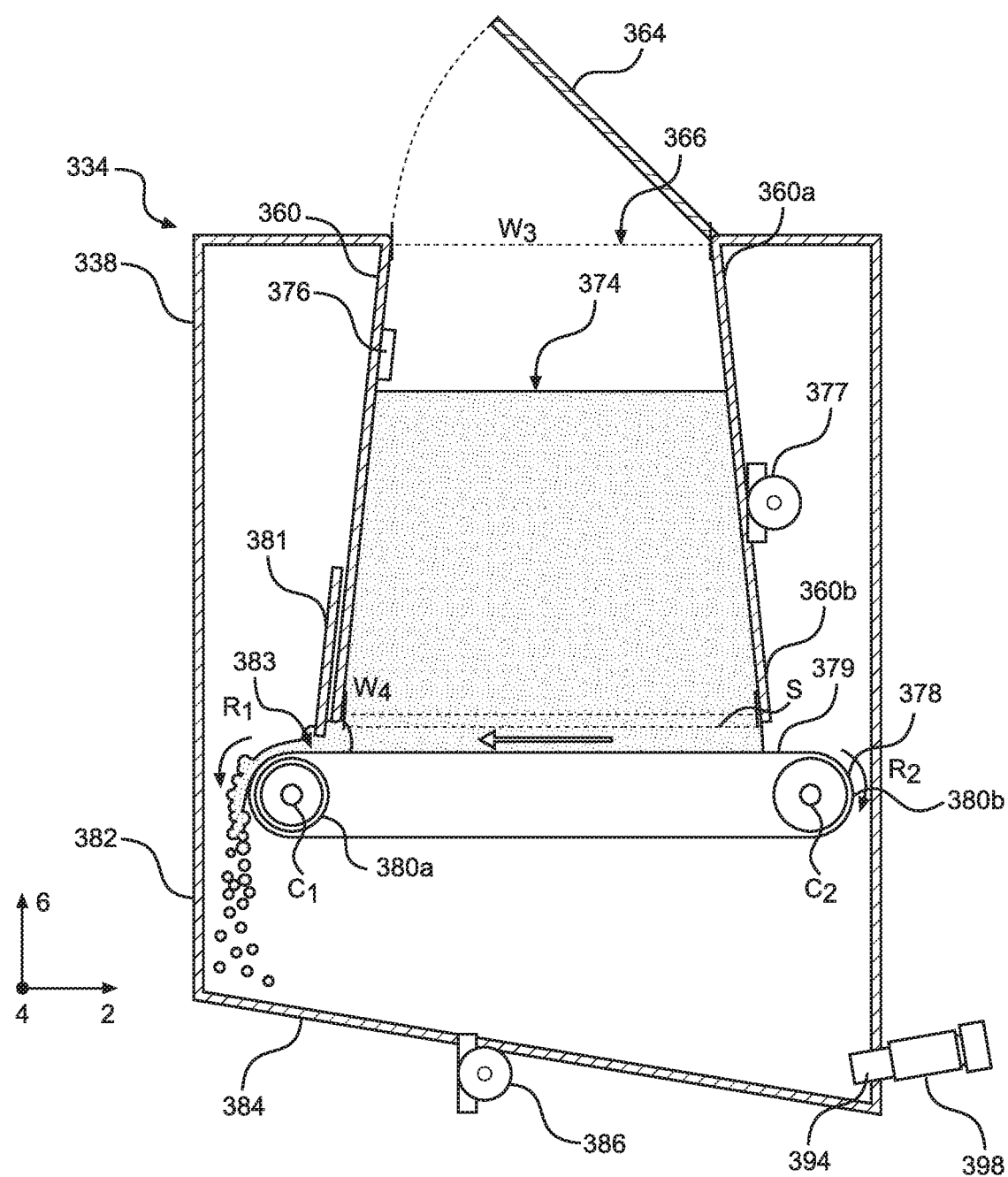
FIG. 17 is a schematic view of a distribution system of the application system shown in FIG. 1A according to another embodiment of the present disclosure.

Referring to FIG. 17, the distribution bin 382 will be described in detail. The distribution bin 382 can be configured to receive and hold a supply of the material from the conveyor belt 379. As depicted, the distribution bin 382 can be integrally connected to the housing 338, though it is contemplated that they can be separate components. The distribution bin 382 is positioned below the hopper 360, such that the distribution bin 382 can receive material fluidized by the conveyor belt 379. The distribution bin 382 can include a plate 384 at its bottom that guides the material transferred from the hopper 360 to one or more outlets 394 that are in communication with one or more melters 26a-26d. Though one outlet 394 is specifically shown, the distribution system 334 can include a plurality of outlets. The outlet 394 can be in fluid communication with a transfer pump 398 for pumping the material from the distribution bin 382 and through the outlet 394. In one embodiment, the transfer pump 398 can be a pneumatic transfer pump, though other types of suitable pumps are contemplated.

As noted above, the distribution bin 382 can include a plate 384 configured to direct adhesive particulate toward the outlet 394. An agitation device 386 can be operatively coupled to the plate 384 for agitating material particulates disposed thereon so as to encourage flow of the material down the plate 384 and to the outlet 394. In the depicted embodiment, the agitation device 386 is coupled to the bottom of the plate 384, though other positions for the agitation device are contemplated. In some embodiments, the agitation device 386 may be configured to vibrate the plate 384, although other types of agitation may be used in other embodiments of the distribution bin 382.

Figure 18:
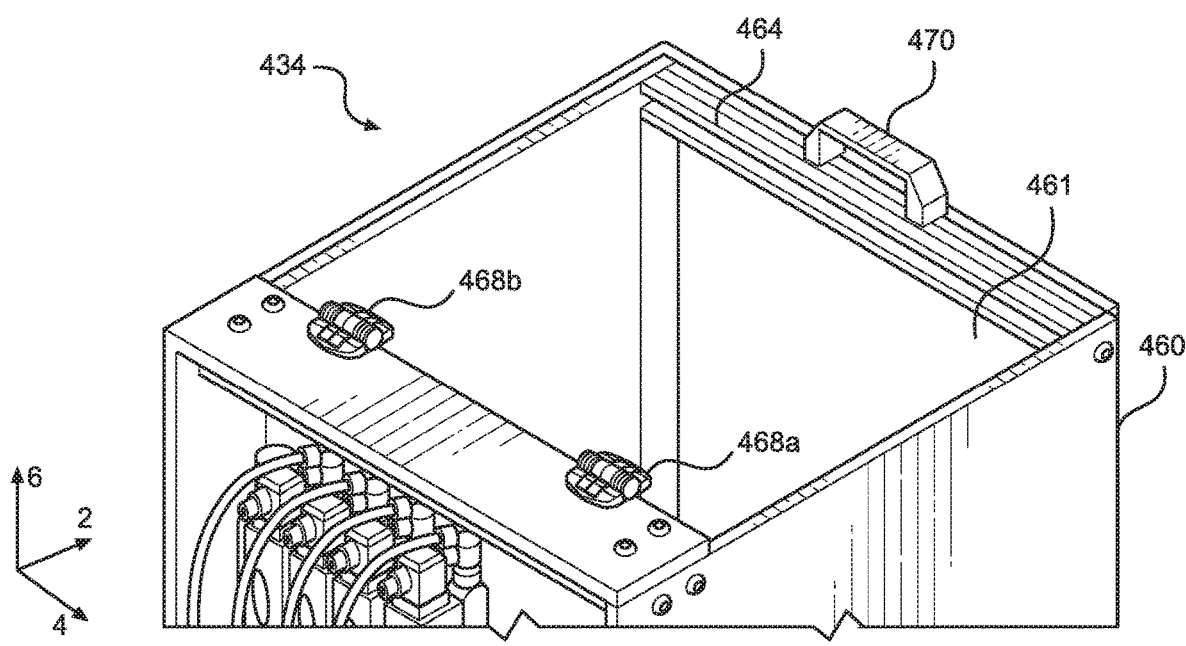
FIG. 18 is a top perspective view of a distribution system of the application system shown in FIG. 1A according to another embodiment of the present disclosure.
Figure 19:
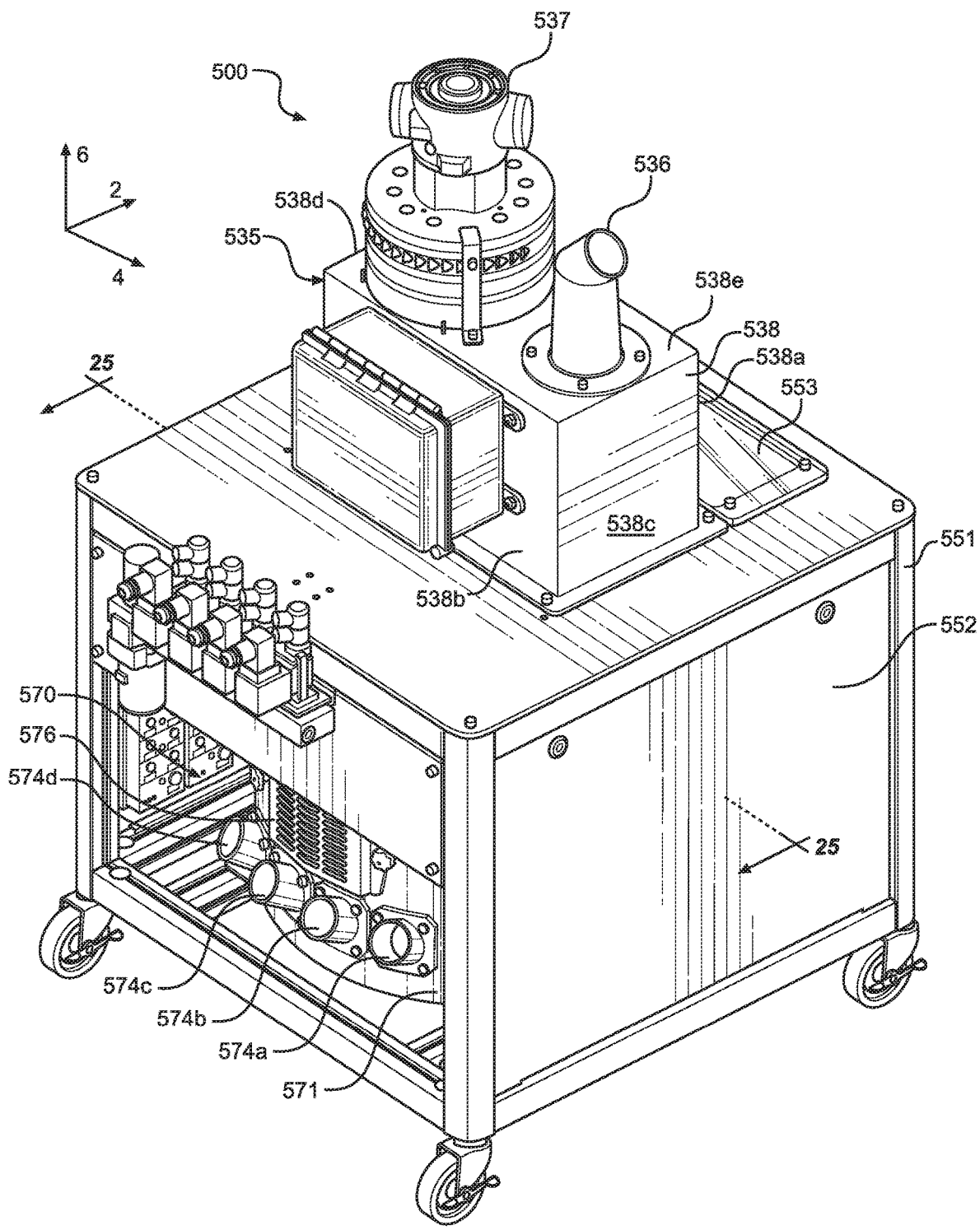
FIG. 19 is a perspective view of a booster bin of the application system shown in FIG. 1C.
Figure 20:
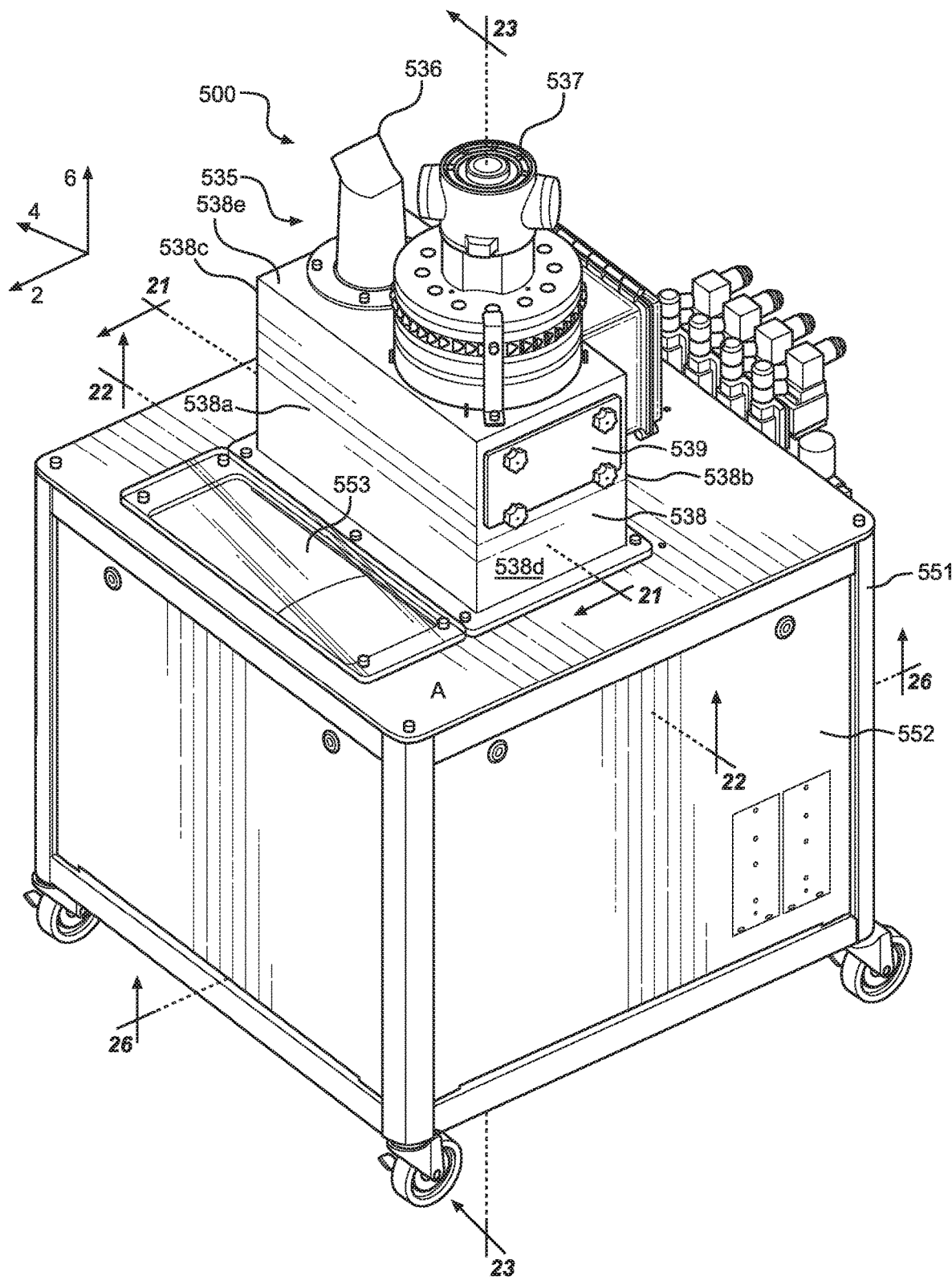
FIG. 20 is an alternative perspective view of a booster bin of the application system shown in FIG. 1C.
Figure 21:
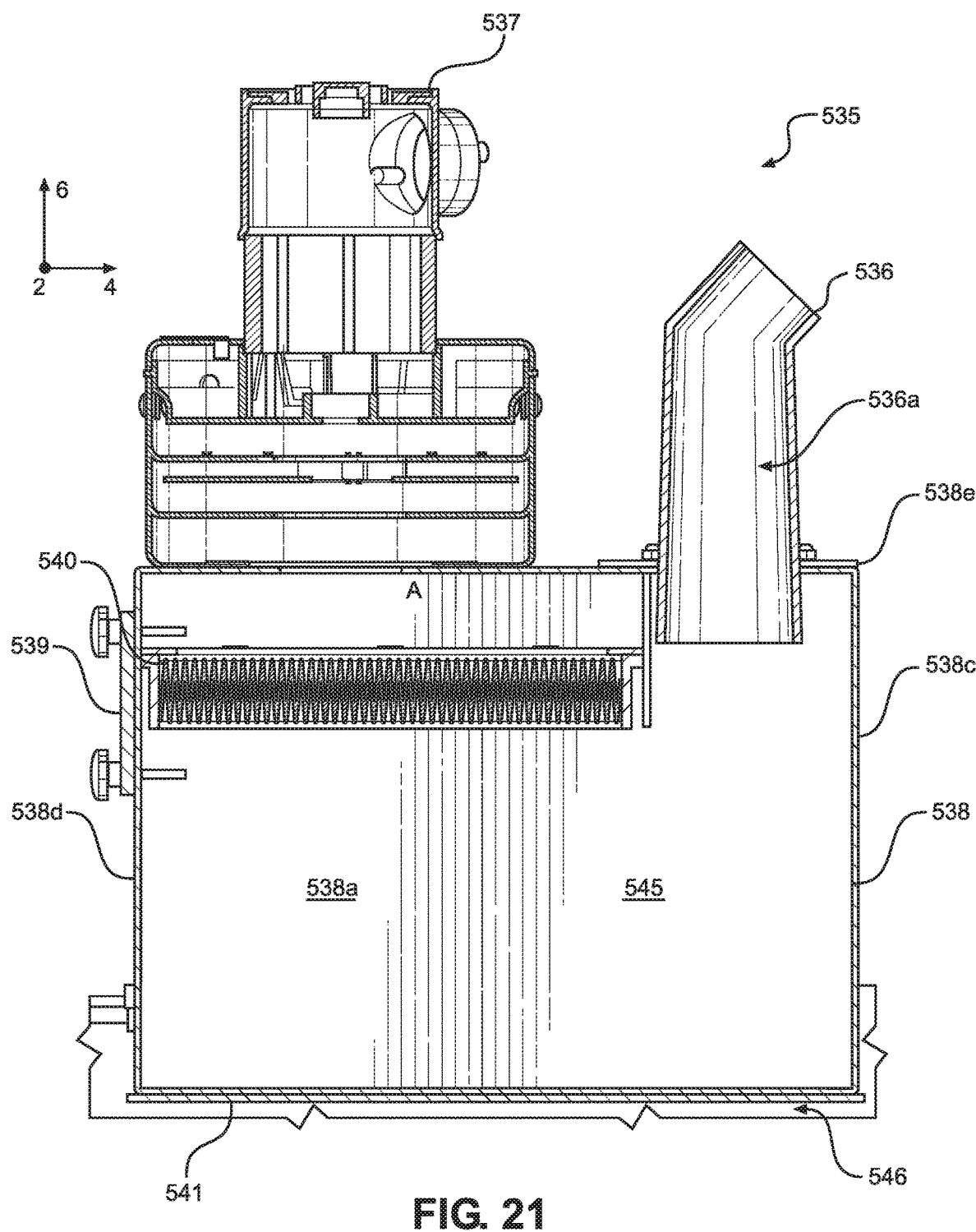
FIG. 21 is a side cross-sectional view of a vacuum unit of the booster bin shown in FIG. 19, taken along line 21-21 shown in FIG. 20
Figure 22:
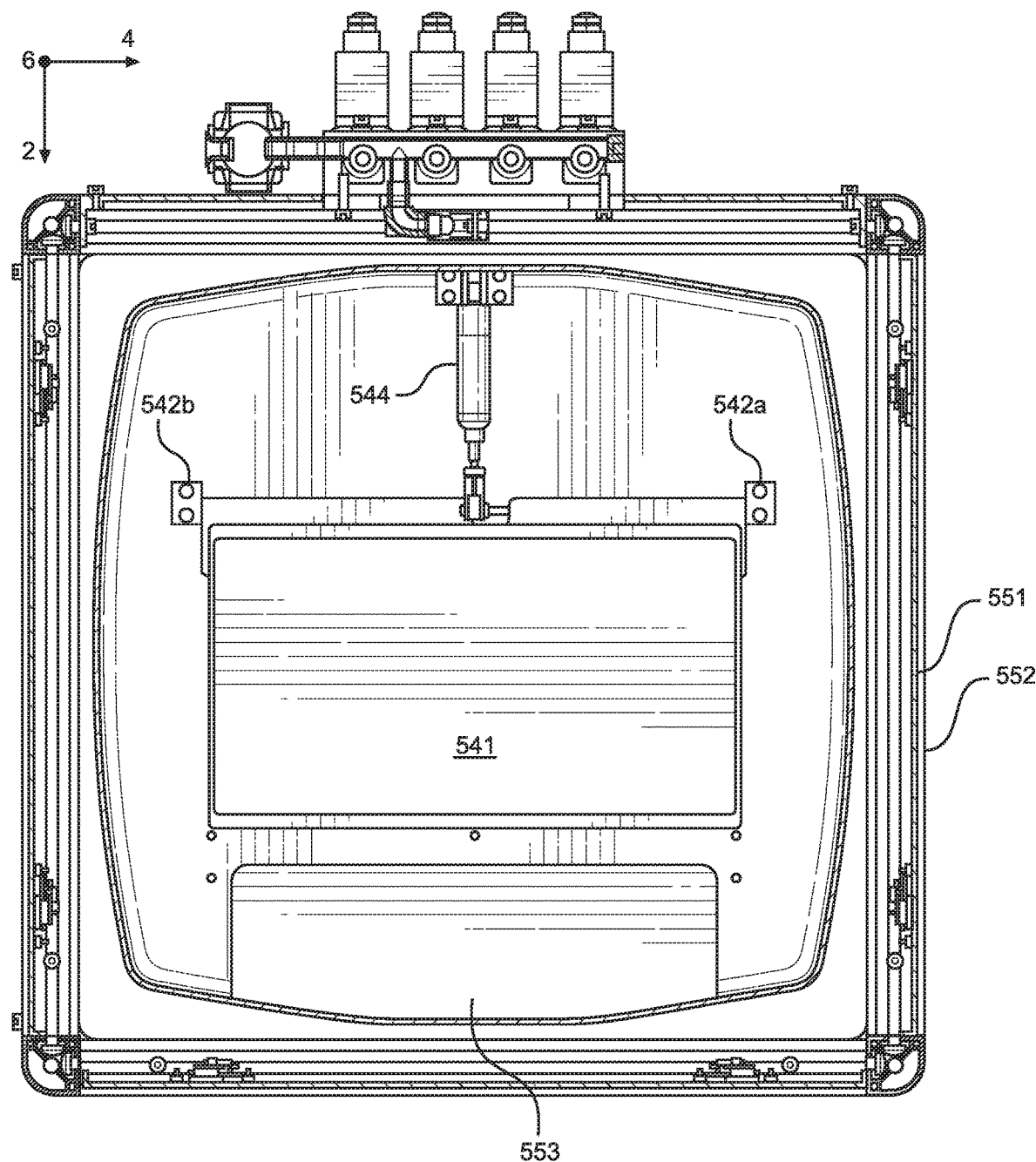
FIG. 22 is an upper cross-sectional view of the booster bin shown in FIG. 19, taken along line 22-22 shown in FIG. 20.
Figure 23:
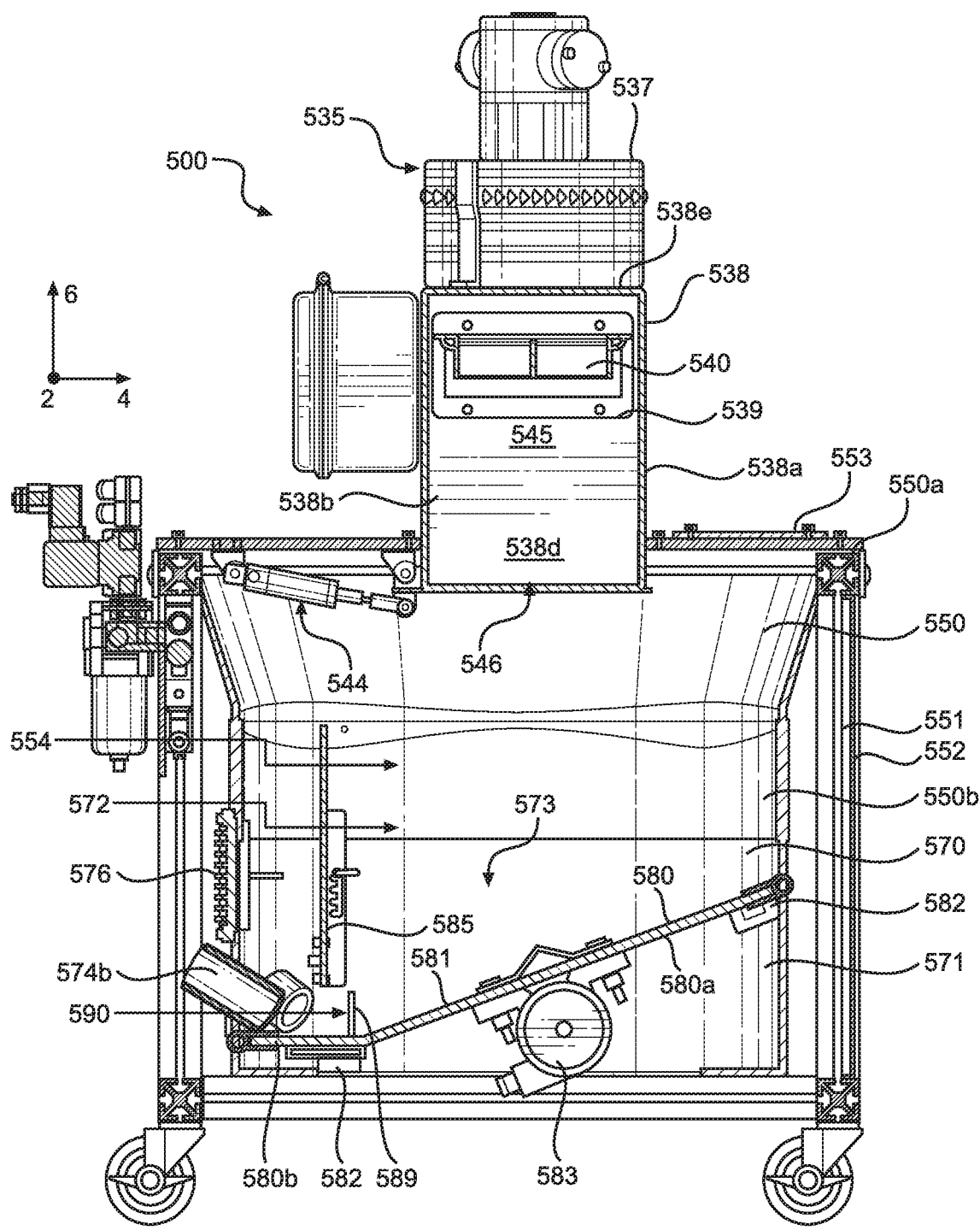
FIG. 23 is a side cross-sectional view of the booster bin shown in FIG. 19, taken along line 23-23 shown in FIG. 20.
Figure 24:
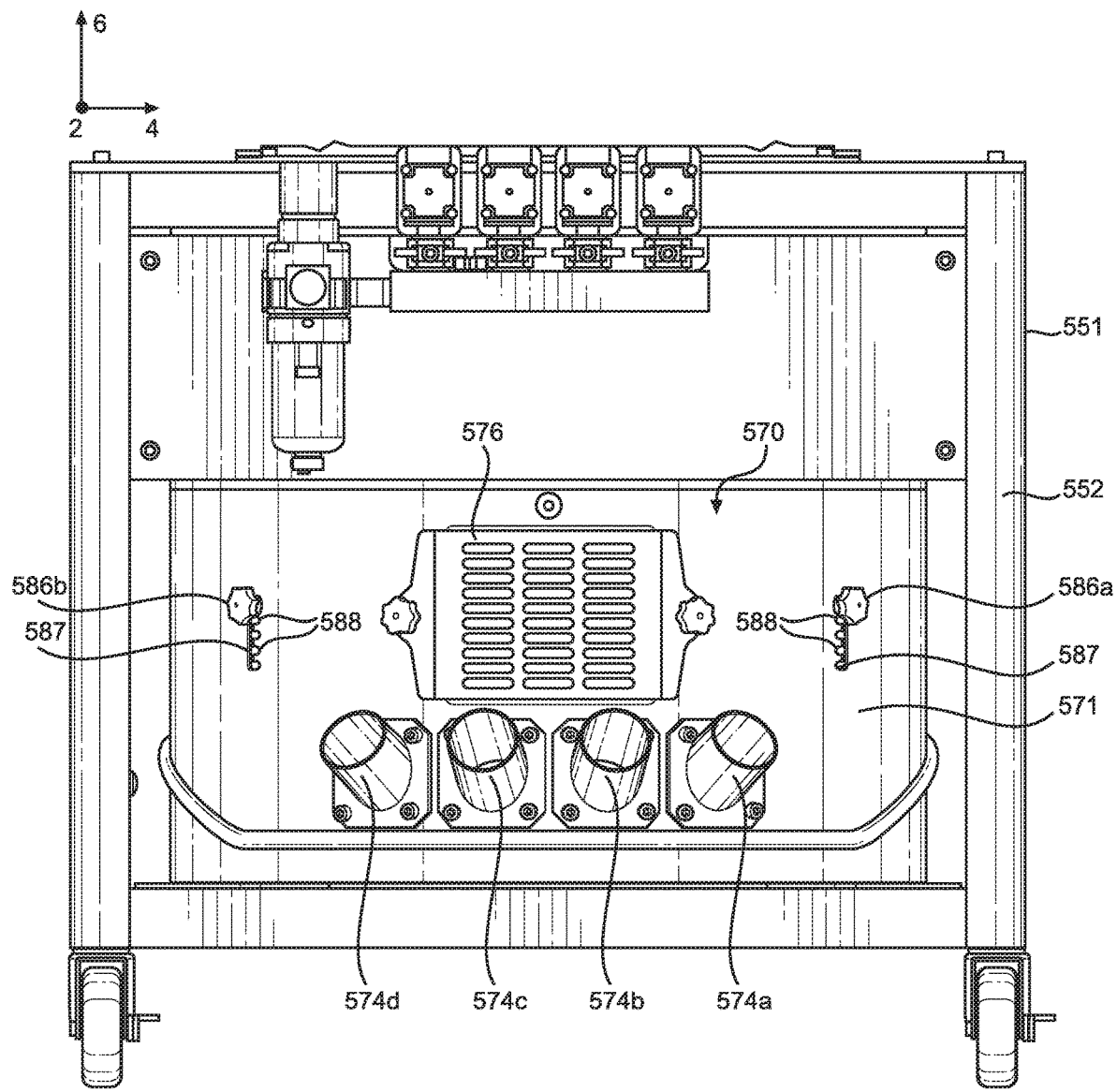
FIG. 24 is an enlarged rear view of a lower portion of the booster bin shown in FIG. 19.
Figure 25:
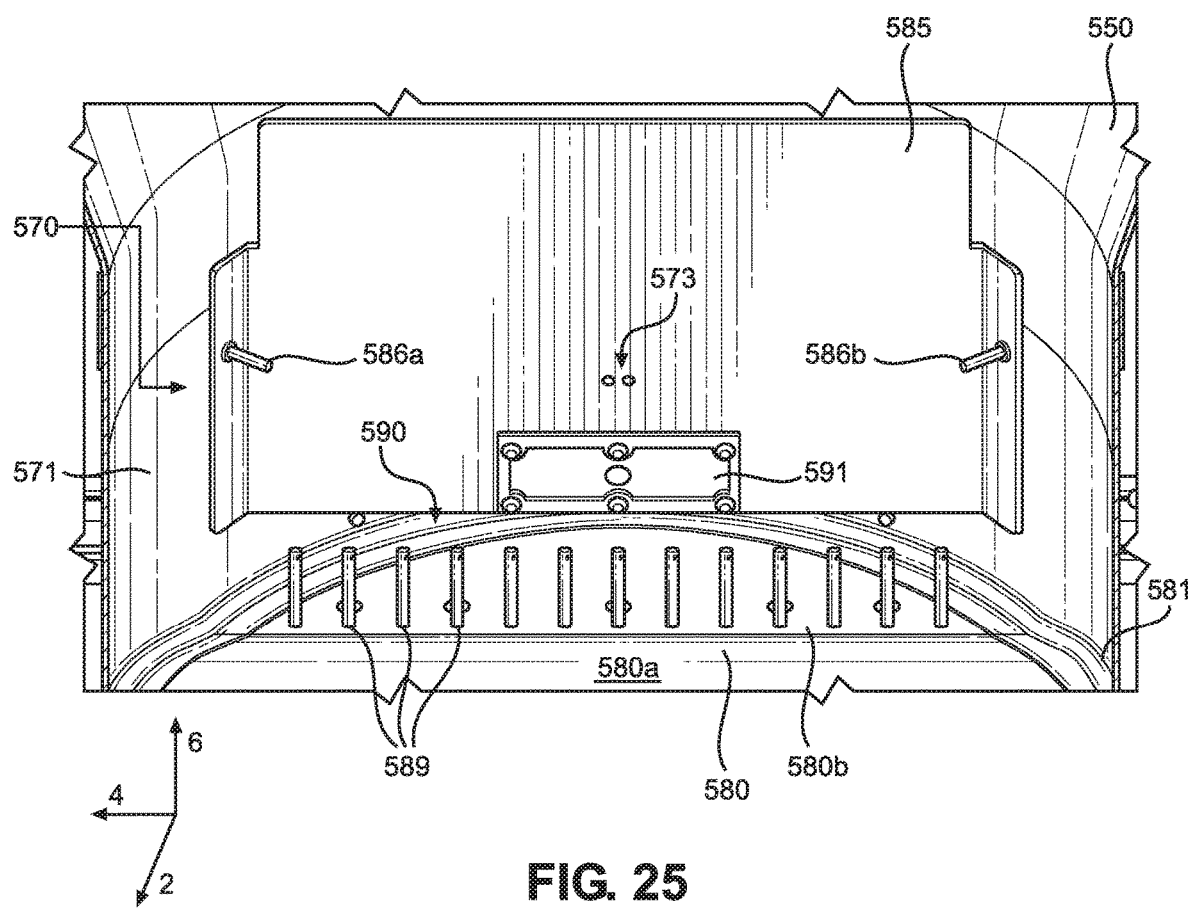
FIG. 25 is a rear cross-sectional view of the booster bin shown in FIG. 19, taken along line 25-25 shown in FIG. 19.
Figure 26:
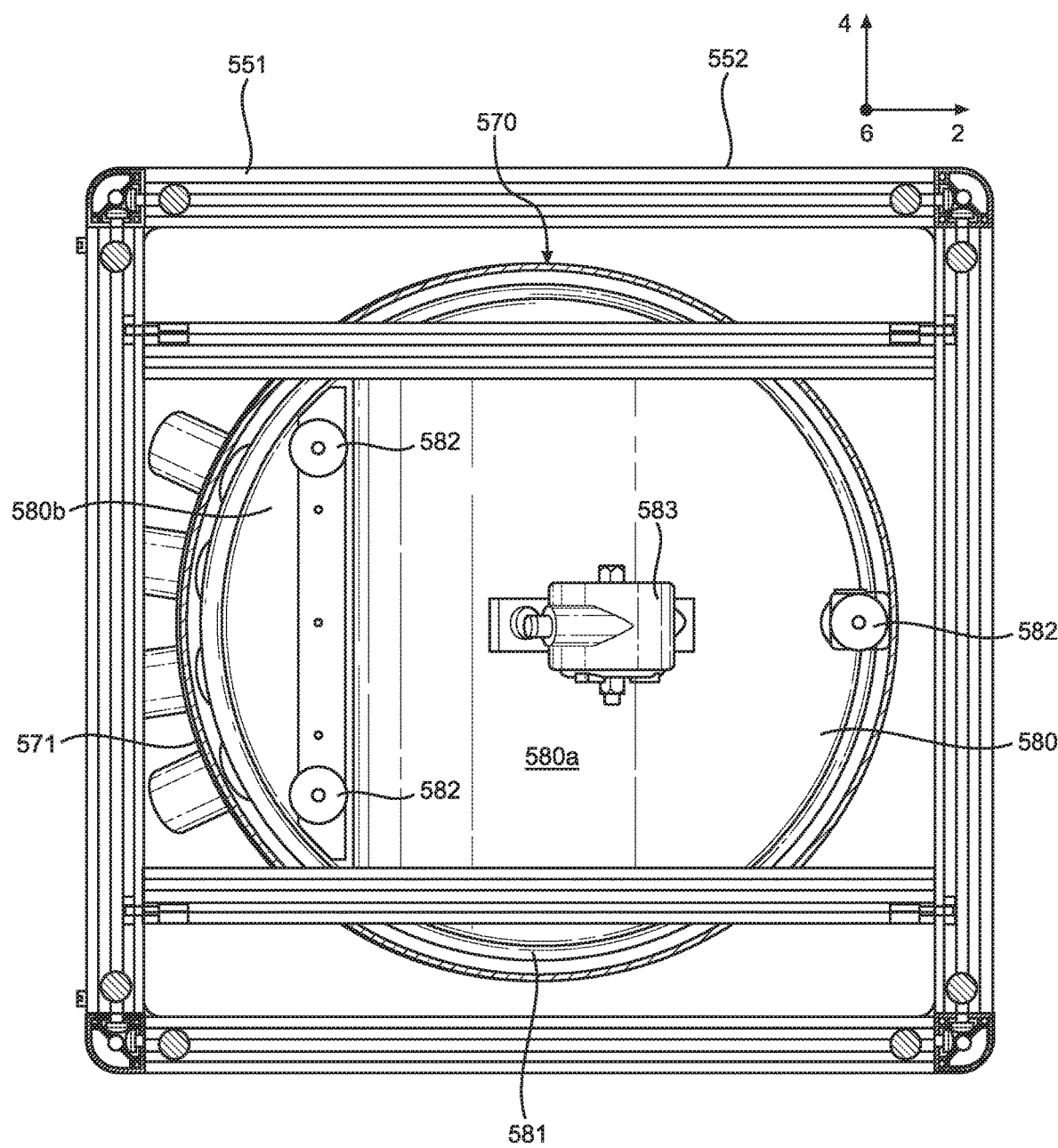
FIG. 26 is an upper cross-sectional view of the booster bin shown in FIG. 19, taken along line 26-26 shown in FIG. 20.

Now referring to FIG. 18, another embodiment of a distribution system 434 will be described. The distribution system 434 can have a hopper 460 that defines an opening 461 for receiving material. Unlike the distribution system 234, the distribution system 434 does not include a vacuum unit for providing material to the hopper. Instead, the distribution system 434 can include a lid 464 coupled to the hopper 460 for selectively providing access to the hopper 460 and covering the opening 461. The lid 464 can be coupled to the hopper 460 via a first hinge 468a and a second hinge 468b. The first and second hinges 468a, 468b can be configured to allow the lid 464 to selectively swing open and closed to cover and uncover the opening 461, thus allowing and preventing access to the opening 461 of the hopper 460. Though coupling to the hopper 460 via first and second hinges 468a, 468b is specifically shown, the lid 464 can be coupled to the hopper 460 via more or less than two hinges, or through other means as desired. The lid 464 can also be manually opened and closed via a handle 470 coupled to the lid 464.

The features of the above-described distribution systems 34, 234, 334, 434 in particular the conveyors 87, 279, 378, facilitate the selective fluidization and transfer of material, such as a hot melt adhesive, to a plurality of downstream melters. By directly engaging and acting upon a supply of the material within a hopper 60, 260, 360, 460 using rollers 88a-88h, 280a-280g or a conveyor belt 379, discrete amounts of the material can be selectively fluidized and transferred within the distribution systems 34, 234, 334, 434 while effectively breaking up clumps or other formations of the material or preventing these clumps from forming. This can lead to greater efficiency in pumping the material from the distribution systems 34, 234, 334, 434 and the prevention of clogging of downstream hoses and other components, as well as decreases in machine downtime, labor costs, and upkeep.

Now referring to FIGS. 19-26, a booster bin 500 of the application system 10″ will be described in detail. With reference to FIGS. 19-22, the booster bin 500 can include a vacuum unit 535 attached to an upper end of a housing 552 of the booster bin 500, which will be described further below. The vacuum unit 535 can include an entry hose 536 configured to connect to the transfer hose 19 that extends from the transfer bin 18, where the vacuum unit 535 is configured to allow material to be drawn through the transfer hose 19, through a channel 536a defined by the entry hose 536, and into the vacuum unit 535. The vacuum unit 535 can comprise a housing 538, where the housing 538 defines a hollow rectangular box. As such, the housing 538 can include a front side 538a, a rear side 538b opposite the front side 538a along the longitudinal direction 2, left side 538c that extends from the front side 538a to the rear side 538b, and a right side 538d opposite the left side 538c along the lateral direction 4 that also extends from the front side 538a to the rear side 538b. The housing 538 can also include a top side 538e that extends between each of the sides 538a-538d.

The housing 538 of the vacuum unit 535 can define a chamber 545 configured to receive the material entering the housing 538 through the entry hose 536 and store an amount of the material. The vacuum unit 535 can further include a vacuum pump 537 attached to the housing 538 at the top side 538e and in communication with the chamber 545. The vacuum pump 537 can be configured to provide a vacuum force within the chamber 545 such that the material is pulled through the transfer hose 20 and into the chamber 545. The vacuum pump 537 can comprise an electrically-powered vacuum motor using an integrated turbine to create a suction force, though other types of vacuum pumps are contemplated. The vacuum unit 535 can include a filter 540 disposed within the chamber 545 adjacent the vacuum pump 537 so as to prevent material brought into the chamber 545 from being sucked into the vacuum pump 537, which would cause the vacuum pump 537 to operate poorly or completely malfunction. The vacuum unit 535 can also include a level sensor 539 attached to the housing 538. Though depicted as attached to the right side 538d, it is contemplated that the level sensor 539 can be attached to any of the sides 538a-538d as desired. The level sensor 539 can be a capacitive sensor, though other types of level sensors are contemplated. In operation, the level sensor 539 can be configured to detect the level of material disposed within the chamber 545 of the vacuum unit 535. The level sensor 539 can be in signal communication with the controller 30, such that the level sensor 539 can send a signal to the controller 30 that is indicative of the measured material level within the chamber 545. The controller 30 can be configured to direct the vacuum pump 537 to pull material into the chamber 545 until the level sensor 539 detects a predetermined level of material within the chamber 545. Alternatively, the controller 30 can direct the vacuum pump 537 to pull material into the chamber 545 in a time-based pattern.

To allow material to transfer from the vacuum unit 535 to the hopper 560, the housing 538 can define an opening 546 at the bottom of the chamber 545 that allows the chamber 545 to be in fluid communication with the internal chamber 573 defined by the distribution bin 570 of the booster bin 500, where the distribution bin 570 will be described further below. To control the transfer of material from the vacuum unit 535 to the distribution bin 570, the booster bin 500 can include a trap door 541 configured to selectively cover the opening 546. Specifically, the trap door 541 can be configured to rotate about the longitudinal direction 2 to selectively cover the opening 546. However, in other embodiments, the trap door 541 can utilize other methods of movement, such as translation along any of the longitudinal, lateral, and vertical directions 2, 4, 6, rotation about an axis other than the longitudinal axis 2, etc.

To enable movement of the trap door 541, the booster bin 500 can include first and second hinges 542a, 542b that attach the trap door 541 to the housing 552. To move the trap door 541, a hydraulic cylinder 544 can be attached to the trap door 541 and the housing 552. The controller 30 can be in signal communication with the hydraulic cylinder 544 so as to instruct the hydraulic cylinder 544 to selectively translate so as to rotate the trap door 541 about the first and second hinges 542a, 542b. In operation, the trap door 541 is configured to transition between a closed position, where the trap door 541 covers the opening 546 to prevent material from falling from the chamber 545, and an open position, where the trap door 541 is rotated to as to be at least partially offset from the opening 546 to allow material to fall from the chamber 545 into the internal chamber 573. The controller 30 can automatically instruct the hydraulic cylinder 544 to transition the trap door 541 between the open and closed positions, or only do so upon receiving instructions from the operator via the HMI device of the controller 30. Additionally, the trap door 541 can be transitioned from the closed position to the open position based upon the level of material within the chamber 546 as sensed by the level sensor 539. In one embodiment, the trap door 541 is configured to transition from the closed position to the open position when the level sensor 539 detects that a level of the material within the chamber 545 reaches a predetermined level. The predetermined level can be input by the operator into the HMI device of the controller 30, or can be recalled from the memory of the controller 30 based upon the type of material being used, type of dispensing operation performed by the application system 10", etc. Alternatively, the trap door 541 is configured to transition from the closed position to the open position based upon a time-based fill pattern utilized by the vacuum pump 537.

As stated above, the booster bin 500 can include a housing 552. The housing 552 can be supported by a frame 551, which can be supported by wheels so as to allow for easy movement of the booster bin 500. The housing 552 can define a substantially hollow body that is configured to receive a funnel 550 and the distribution bin 570. The funnel 550 can function as a transition for the material as it flows from the vacuum unit 535 to the distribution bin 570. The funnel 550 can have an upper end 550a that is attached to the top of the frame 551, and a lower end 550b opposite the upper end 550a along the vertical direction 6 that is attached to the distribution bin 570. A passage 554 is defined through the funnel 550 from the upper end 550a to the lower end 550b to allow for the transfer of the material. The funnel 550 can comprise a flexible material, such as a fabric, which allows relative movement between the vacuum unit 535 and the distribution bin 570. The funnel 550 can taper inwards from the upper end 550a to the lower end 550b, thus guiding the material as it is transferred from the vacuum unit 535 to the distribution bin 570. However, it is contemplated that the funnel 550 can comprise different shapes and/or materials, or that the funnel 550 may not be included in the booster bin 500 at all, in which case the distribution bin 570 can be attached directly to the vacuum unit 535. The booster bin 500 can also include a window 530 comprising a transparent material that defines an upper portion of the housing 552, where the window 553 allows an operator of the application system 10" to visually monitor the flow of material through the booster bin 500.

The distribution bin 570 is configured to receive and hold a supply of the material from the vacuum unit 535 and allow for the material to be selectively provided to one of the distribution systems 34, 234, 334, 434. As depicted, the distribution bin 570 is positioned within the booster bin 500 below the vacuum unit 535 and funnel 550. However, other positions for the distribution bin 570 are contemplated. The distribution bin 570 includes a housing 571, an inlet 572, an internal chamber 573 configured to receive the material from the vacuum unit 535, and at least one outlet. The housing 571 can define a substantially circular cross-section, which eliminates corners in which material can cluster and stagnate. Likewise, the internal chamber 573 defined by the housing 571 can define a substantially circular cross-section. The inlet 572 is open to the funnel 550 and is configured to receive the material from the vacuum unit 535 through the passage 554 of the funnel 550, while the internal chamber 573 is configured to receive the material through the inlet 572. After passing through the internal chamber 573, as will be described below, the material is provided to at least one outlet in fluid communication with at least one distribution system 34, 234, 334, 434. For example, the depicted distribution bin 570 includes a first outlet 574a, a second outlet 574b, a third outlet 574c, and a fourth outlet 574d. Though four outlets are specifically shown, the distribution bin 570 can include any number of outlets as desired. Further, in operation any combination of the outlets 574a-574d can be plugged or otherwise closed off, such that they prevent possible contamination of the material and remain unused in a particular dispensing operation. Each of the outlets 574a-574d can be in fluid communication with a transfer pump (not shown) for pumping the material from the distribution bin 570 through the outlets 574a-574d to distribution systems 34, 234, 334, 434.

The distribution bin 570 can include a filter element 576 attached to the housing 571 to filter ambient air and allow the filtered ambient air to enter the internal chamber 573 to promote more effective air flow within the distribution bin 570. The distribution bin 570 can also include a plate 580 surrounded by the housing 571 and configured to direct adhesive particulate contained therein toward the outlets 574a-574d. The plate 580 can define a lower end of the internal chamber 573, such that material falling into the distribution bin 570 from the vacuum unit 535 can be supported by the plate 580. The plate 580 can comprise a sloped portion 580a and a lower portion 580b, where the lower portion 580b can be positioned adjacent the outlets 574a-574d, and the sloped portion 580a can be angularly offset from the lower portion 580b and extend upwards and longitudinally away from the lower portion 580b. The sloped portion 580a, due to its orientation, can be configured to direct the material to flow downwards to the lower portion 580b. An agitation device 583 can be operatively coupled with the plate 580 and configured to transfer force to the plate 580 such that the plate agitates material particulates disposed thereon, which encourages flow of the material down the plate 580 and to the outlets 574a-574d. In the depicted embodiment, the agitation device 583 is coupled to the bottom of the plate 580, though other positions for the agitation device are contemplated. In some embodiments, the agitation device 583 may be configured to vibrate the plate 580, although other types of agitation may be used in other embodiments of the distribution bin 570.

The distribution bin 570 can further include a gasket 581 disposed around at least a portion of the plate 580 and positioned between plate 580 and the housing 571. The gasket 581 can be comprised of a substantially flexible and force-absorbing material, such that the gasket 581 is configured to absorb excess vibration created in the plate 580 by the agitation device 583 and prevent material from falling between the plate 580 and the housing 571. In addition to the gasket 581, the distribution bin 570 can include at least one bumper 582 attached to the bottom surface of the plate 580. Like the gasket 581, the at least one bumper 582 can be comprised of a substantially flexible and force-absorbing material. In the depicted embodiment, the distribution bin 570 includes three bumpers 582—two attached to the lower portion 582b of the plate 580 and one attached to the sloped portion 582a of the plate 580, though other configurations and number of bumpers 582 are contemplated. Together, the gasket 581 and the bumpers 582 are configured to prevent the plate 580 from transferring force created by the agitation device 583 to other components of the booster bin 500, thus preventing further wear or damage on any such components.

The distribution bin 570 can include a level sensor 591 for detecting the amount of material within the internal chamber 573 of the distribution bin 570. The level sensor 591 can be in wired and/or wireless communication with the controller 30 for communication of level readings from the level sensor 591. When the level sensor 591 detects the level of material within the distribution bin 570 is low, the controller 30 can direct the hydraulic cylinder 544 to open the trap door 541 so as to cause more of the material be transferred from the vacuum unit 535 to the distribution bin 570.

The distribution bin 570 can further include a flow control plate 585 attached to an inner surface of the housing 571. The flow control plate 585 can be configured as a flat, substantially planar metallic plate, though the present disclosure is not intended to be limited to such. The flow control plate 585 can extend laterally through the internal chamber 573 and can be spaced from the plate 580, and specifically the lower portion 580b of the plate 580, so as to define a gap 590 between the flow control plate 585 and the plate 580. As a result, the flow control plate 585 can function to restrict the flow of material to the outlets 574a-574d of the distribution bin 570. In the depicted embodiment, the level sensor 591 is attached to the flow control plate 585. Alternatively, the level sensor 591 can be attached to the inner surface of the housing 571.

The flow control plate 585 can be movable along the vertical direction 6 so as to adjust the size of the gap 590. In the depicted embodiment, the distribution bin 570 can include a first pin 586a attached to a first end of the flow control plate 585 and a second pin 586b attached to the opposite end of the flow control plate 585. The first and second pins 586a, 586b can also extend through respective slots 587 defined by the housing 571. In one embodiment, the first and second pins 586a, 586b are attached to the plate by inserting portions of the first and second pins 586a, 586b through the respective slots 587 and threadedly attaching the first and second pins 586a, 586b to the flow control plate 585. However, other methods of attaching the first and second pins 586a, 586b to the flow control plate are contemplated. Each of the slots 587 can define elongated slots that extend substantially vertically through the housing 571, though other shapes and orientations of the slots 587 are contemplated. Each of the first and second pins 586a, 586b is configured to be selectively moved through the respective slot 587 so as to vertically move the flow control plate 585 within the internal chamber 573, thus adjusting the size of the gap 590. The force applied to the first and second pins 586a, 586b to make these adjustments can be applied to the first and second pins 586a, 586b external to the housing 571. This can be advantageous for the operator of the booster bin 500, as it allows the operator to easily, accurately, and manually make changes to the size of the gap 590 without disassembling or coming into contact with any of the internal features of the distribution bin 570. To secure the flow control plate 585 in a desired position, the housing 571 can define a plurality of notches 588 open to each of the slots 587. The notches 588 can be positioned vertically along the slots 587 in set increments, so as to correspond to defined sizes of the gaps 590. As such, the housing 571 can include external markings to inform the operator which gap sizes each of the notches 588 corresponds to. In operation, when each of the first and second pins 586a, 586b is moved through the corresponding slot 587 to a desired location, the operator can dispose the first and second pins 586a, 586b into respective ones of the notches 588 so as to secure the flow control plate 585 in the desired position.

The plate 580 can include a plurality of pins 589 extending upwards in the proximity of the end of the flow control plate 585. In the depicted embodiment, the plate 580, and particularly the lower portion 580b of the plate 580, can have a single laterally-extending row of pins 589. Though pins having particular arrangements and lengths are shown, the plate 580 can include more pins, less pins, pins of different lengths, no pins, etc. The pins 589 can function to, along with the vibration/agitation generated by the agitation device 583, divide the flow of material within the distribution bin 570 so as to break apart clumps of coalesced and/or stuck together material particulates before delivery to the outlets 574a-574d. In operation, the material received by the internal chamber 573 can be directed along the sloped portion 580a of the plate 580, past the pins 589, through the gap 590, to the lower portion 580b of the plate 580, and to the outlets 574a-574d. Once provided to the outlets 574a-574d, the material can be conveyed through the outlets 574a-574d by respective pumps to a corresponding one of the melters.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts, and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Still further, exemplary or representative values and ranges may be included to assist in understanding the present disclosure; however, such values and ranges are not to be construed in a limiting sense and are intended to be critical values or ranges only if so expressly stated. Descriptions of exemplary methods or processes are not limited to inclusion of all steps as being required in all cases, nor is the order that the steps are presented to be construed as required or necessary unless expressly so stated.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed is:

1. A distribution system for storing and conveying a supply of material to a melter, the distribution system comprising:
   a hopper defining a cavity for storing the supply of material, the hopper having an upper end and a lower end opposite the upper end along a vertical direction;
   a conveyor positioned at the lower end of the hopper and configured to directly engage and act upon the supply of material within the hopper, wherein a portion of the conveyor is configured to rotate about an axis that is perpendicular to the vertical direction so as to selectively transfer a quantity of the material from the hopper, wherein the conveyor comprises:
   a plurality of rollers;
   an arm operably connected to the plurality of rollers; and
   a pneumatic cylinder operably connected to the arm, wherein the pneumatic cylinder is configured to move the arm so as to simultaneously rotate each of the plurality of rollers in a uniform rotational direction; and
   a distribution bin configured to receive the material from the hopper, the distribution bin comprising:
   a housing defining an internal chamber configured to receive the material;
   at least one outlet configured to direct the material from the distribution bin;
   a plate defining a lower end of the internal chamber and configured to support the material and direct the material to the at least one outlet; and
   an agitation device attached to the plate, wherein the agitation device is configured to transfer force to the plate such that the plate agitates the material within the internal chamber.

2. The distribution system of claim 1, wherein, the bin comprises:
   a gasket disposed between the plate and the housing, wherein the gasket is configured to prevent the plate from transferring force to other components of the distribution bin.

3. The distribution system of claim 2, further comprising:
   at least one bumper attached to a bottom surface of the plate, wherein the at least one bumper is configured to prevent the plate from transferring force to other components of the distribution bin.

4. The distribution system of claim 1, further comprising:
   a flow control plate attached to the housing, wherein a gap is defined between the flow control plate and the plate.

5. The distribution system of claim 4, further comprising:
   a level sensor attached to the flow control plate, wherein the level sensor is configured to detect a level of the material within the internal chamber.

6. The distribution system of claim 4, further comprising:
   at least one pin attached to the flow control plate and extending through at least one slot defined by the housing, wherein the at least one pin is configured to be selectively moved through the at least one slot under a force applied to the at least one pin external to the housing so as to selectively adjust a size of the gap.

7. The distribution system of claim 1, further comprising a vacuum unit having a vacuum pump configured to pull material from a bulk supply and to the internal chamber through an entry hose.

8. The distribution system of claim 7, further comprising:
   a trap door configured to transition between 1) a closed position, where the trap door covers an opening defined at the lower end of a chamber of the vacuum unit to prevent the material from falling from the internal chamber of the vacuum unit; and 2) an open position, where the trap door is at least partially offset from the opening to allow material to fall from the chamber.

9. The distribution system of claim 8, wherein the vacuum pump further comprises a level sensor, wherein the trap door is configured to transition from the closed position to the open position when the level sensor detects that a level of the material within the internal chamber exceeds a threshold.

10. The distribution system of claim 7, further comprising:
    a funnel defining an upper end, a lower end opposite the upper end, and a passage extending through the funnel from the upper end to the lower end, wherein the funnel is configured to receive the material from the vacuum pump.

11. The distribution system of claim 1, wherein the arm is a first arm and the pneumatic cylinder is a first pneumatic cylinder, the conveyor further comprising:
    a second arm connected to the plurality of rollers opposite the first arm; and
    a second pneumatic cylinder operably connected to the second arm,
    wherein the second pneumatic cylinder is configured to move the second arm so as to simultaneously rotate each of the plurality of rollers in the uniform rotational direction.

12. The distribution system of claim 1, wherein each of the plurality of rollers has an outer surface and a plurality of protrusions extending radially outward from the outer surface.

13. The distribution system of claim 1, wherein the conveyor comprises a conveyor belt.

14. The distribution system of claim 1, further comprising:
    a vacuum unit attached to the upper end of the hopper, wherein the vacuum unit comprises:
    an entry hose configured to receive the material from a bulk supply of the material;
    a chamber configured to receive the material from the entry hose and store an amount of the material; and
    a vacuum pump configured to pull the material from the bulk supply and to the chamber through the entry hose.

15. The distribution system of claim 14, further comprising:
    a trap door configured to move along a longitudinal direction that is perpendicular to the vertical direction, wherein the trap door is configured to transition between 1) a closed position, where the trap door covers an opening defined by the upper end of the hopper to prevent the material from falling from the chamber of the vacuum unit to the cavity of the hopper; and 2) an open position, where the trap door is at least partially offset from the opening along the longitudinal direction to allow material to fall from the chamber to the cavity.

16. The distribution system of claim 15, wherein the vacuum unit further comprises a level sensor, wherein the trap door is configured to transition from the closed position to the open position when the level sensor detects that a level of the material within the chamber exceeds a threshold.

17. A distribution system for storing and conveying a supply of material to a melter, the distribution system comprising:
  a hopper defining a cavity for storing the supply of material, the hopper having an upper end and a lower end opposite the upper end along a vertical direction;
  a conveyor positioned at the lower end of the hopper and configured to directly engage and act upon the supply of material within the hopper, wherein a portion of the conveyor is configured to rotate about an axis that is perpendicular to the vertical direction so as to selectively transfer a quantity of the material from the hopper, wherein the conveyor comprises a plurality of rollers, wherein each of the plurality of rollers is spaced apart by a gap and the conveyor further comprises a plurality of gates, wherein each of the plurality of gates is attached to a respective one of the plurality of rollers; and
  a distribution bin configured to receive the material from the hopper, the distribution bin comprising:
    a housing defining an internal chamber configured to receive the material;
    at least one outlet configured to direct the material from the distribution bin;
    a plate defining a lower end of the internal chamber and configured to support the material and direct the material to the at least one outlet; and
    an agitation device attached to the plate, wherein the agitation device is configured to transfer force to the plate such that the plate agitates the material within the internal chamber.

18. The distribution system of claim 17, wherein each of the plurality of gates is movable with respect to the plurality of rollers so as to adjust a size of the gap.

19. A distribution system for storing and conveying a supply of material to a melter, the distribution system comprising:
  a hopper defining a cavity for storing the supply of material, the hopper having an upper end and a lower end opposite the upper end along a vertical direction;
  a conveyor positioned at the lower end of the hopper and configured to directly engage and act upon the supply of material within the hopper, wherein a portion of the conveyor is configured to rotate about an axis that is perpendicular to the vertical direction so as to selectively transfer a quantity of the material from the hopper;
  a distribution bin configured to receive the material from the hopper, the distribution bin comprising:
    a housing defining an internal chamber configured to receive the material;
    at least one outlet configured to direct the material from the distribution bin;
    a plate defining a lower end of the internal chamber and configured to support the material and direct the material to the at least one outlet; and
    an agitation device attached to the plate, wherein the agitation device is configured to transfer force to the plate such that the plate agitates the material within the internal chamber; and
  a gate attached to the lower end of the hopper so as to define a gap between the gate and the conveyor configured to allow the material to pass through, wherein the gate is movable relative to the conveyor so as to adjust a size of the gap.

20. A distribution system for storing and conveying a supply of material, the distribution system comprising:
  a hopper defining a cavity for storing the supply of material, the hopper having an upper end and a lower end opposite the upper end along a vertical direction;
  a conveyor positioned at the lower end of the hopper and configured to directly engage and act upon the supply of material within the hopper, wherein the conveyor is configured to selectively transfer a quantity of the material from the hopper; and
  a distribution bin comprising:
    a housing defining an internal chamber configured to receive the material from the hopper;
    at least one outlet configured to direct the material from the distribution bin;
    a plate defining a lower end of the internal chamber and configured to support the material, wherein the plate defines at least one passage extending therethrough and wherein the plate defines a lower portion adjacent the at least one outlet and a sloped portion, wherein the sloped portion is angularly offset from the lower portion and configured to direct the material to flow downwards to the lower portion, wherein the at least one passage extends through the lower portion of the plate; and
    a manifold positioned below the plate, wherein the manifold is configured to direct pressurized air through the at least one passage so as to move the material within the internal chamber.

21. The distribution system of claim 20, wherein the manifold defines an input configured to receive the pressurized air and a body passage configured to direct the pressurized air from the input to the at least one passage.

22. The distribution system of claim 20, wherein the distribution bin comprises:
  an agitation device attached to the plate, wherein the agitation device is configured to transfer force to the plate such that the plate agitates the material within the internal chamber;
  a gasket disposed between the plate and the housing; and
  at least one bumper attached to a bottom surface of the plate,
  wherein the gasket and the at least one bumper are configured to prevent the plate from transferring force to other components of the distribution system.

23. A distribution system for storing and conveying a supply of material, the distribution system comprising:
  a hopper defining a cavity for storing the supply of material, the hopper having an upper end and a lower end opposite the upper end along a vertical direction;
  a conveyor positioned at the lower end of the hopper and configured to directly engage and act upon the supply of material within the hopper, wherein the conveyor is configured to selectively transfer a quantity of the material from the hopper; and a distribution bin comprising:
- a housing defining an internal chamber configured to receive the material from the hopper;
- at least one outlet configured to direct the material from the distribution bin;
- a plate defining a lower end of the internal chamber and configured to support the material, wherein the plate defines at least one passage extending therethrough;
- a manifold positioned below the plate, wherein the manifold is configured to direct pressurized air through the at least one passage so as to move the material within the internal chamber; and
- a flow control plate attached to the housing, wherein a gap is defined between the flow control plate and the plate.

24. The distribution system of claim 23, wherein the distribution bin further comprises:
- a level sensor attached to the plate, wherein the level sensor is configured to detect a level of the material within the internal chamber.

25. The distribution system of claim 23, wherein the distribution bin further comprises:
- at least one pin attached to the flow control plate and extending through at least one slot defined by the housing, wherein the at least one pin is configured to be selectively moved through the at least one slot under a force applied to the at least one pin external to the housing so as to selectively adjust a size of the gap.

* * * * *